US010395347B2

(12) United States Patent
Tanaka et al.

(10) Patent No.: US 10,395,347 B2

(45) **Date of Patent: *Aug. 27, 2019**

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Junichi Tanaka, Saitama (JP); Kenkichi Hayashi, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 15/789,015

(22) Filed: Oct. 20, 2017

(65) Prior Publication Data

US 2018/0040108 A1 Feb. 8, 2018

Related U.S. Application Data

(63) Continuation of application No. PCT/JP2016/062169, filed on Apr. 15, 2016.

(30) Foreign Application Priority Data

Apr. 23, 2015 (JP) ................................. 2015-088228

(51) Int. Cl.
*H04N 5/33* (2006.01)
*G06T 5/00* (2006.01)
(Continued)

(52) U.S. Cl.
CPC .............. *G06T 5/003* (2013.01); *G02B 5/208* (2013.01); *G03B 11/00* (2013.01); *G06T 5/20* (2013.01);
(Continued)

(58) Field of Classification Search
CPC ......... G06T 5/003; G02B 5/208; G03B 11/00; H04N 5/2254; H04N 5/23212; H04N 5/23229; H04N 5/23245; H04N 5/332
(Continued)

(56) References Cited

U.S. PATENT DOCUMENTS

2003/0184663 A1 10/2003 Nakano et al.
2010/0245657 A1 9/2010 Adachi et al.
(Continued)

FOREIGN PATENT DOCUMENTS

JP 2002-300461 A 10/2002
JP 2008-113704 A 5/2008
(Continued)

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2016/062169, dated Nov. 2, 2017, with an English translation of the Written Opinion.
(Continued)

*Primary Examiner* — Nguyen T Truong
(74) *Attorney, Agent, or Firm* — Birch, Stewart, Kolasch & Birch, LLP

(57) ABSTRACT

In a case where IR data of a near-infrared light image is data in which a visible light component and a near-infrared light component coexist, a point image restoration process is performed on the IR data using a first point image restoration filter based on a first point spread function for visible light of the optical system and a second point image restoration filter based on a second point spread function for near-infrared light of the optical system. An appropriate point image restoration process is performed on the IR data that is captured in a time zone of twilight or dawn by performing
(Continued)

weighted averaging on a point image restoration process using the first point image restoration filter and a point image restoration process using the second point image restoration filter using a first gain α and a second gain β according to a light amount ratio between visible light and near-infrared light at the time of capturing the IR data.

19 Claims, 18 Drawing Sheets

(51) Int. Cl.

| | |
|---|---|
| ***G03B 11/00*** | (2006.01) |
| ***G02B 5/20*** | (2006.01) |
| ***G06T 5/20*** | (2006.01) |
| ***H04N 5/225*** | (2006.01) |
| ***H04N 5/232*** | (2006.01) |
| *G03B 15/00* | (2006.01) |

(52) U.S. Cl.
CPC ....... *H04N 5/2254* (2013.01); *H04N 5/23212* (2013.01); *H04N 5/23229* (2013.01); *H04N 5/23245* (2013.01); *H04N 5/332* (2013.01); *G03B 15/00* (2013.01); *G06T 2207/10048* (2013.01)

(58) Field of Classification Search
USPC .......................................................... 348/164
See application file for complete search history.

(56) References Cited

U.S. PATENT DOCUMENTS

| | | | |
|---|---|---|---|
| 2011/0135216 | A1 | 6/2011 | Hatakeyama |
| 2011/0199514 | A1 | 8/2011 | Tamura |
| 2013/0050546 | A1 | 2/2013 | Kano |
| 2013/0278726 | A1 | 10/2013 | Muhammad et al. |
| 2015/0207962 | A1 | 7/2015 | Sugimoto et al. |
| 2015/0379695 | A1 | 12/2015 | Naruse et al. |
| 2016/0027157 | A1 | 1/2016 | Naruse et al. |
| 2016/0119560 | A1 | 4/2016 | Hayashi et al. |

FOREIGN PATENT DOCUMENTS

| | | | |
|---|---|---|---|
| JP | 2010-140442 | A | 6/2010 |
| JP | 2010-230776 | A | 10/2010 |
| JP | 2011-123589 | A | 6/2011 |
| JP | 2011-128238 | A | 6/2011 |
| JP | 2013-51524 | A | 3/2013 |
| JP | 2014-507856 | A | 3/2014 |
| JP | 2014-64304 | A | 4/2014 |
| WO | WO 2014/136322 | A1 | 9/2014 |
| WO | WO 2014/148074 | A1 | 9/2014 |
| WO | WO 2014/155755 | A1 | 10/2014 |
| WO | WO 2015/015966 | A1 | 2/2015 |

OTHER PUBLICATIONS

International Search Report (Form PCT/ISA/210) for corresponding International Application No. PCT/JP2016/062169, dated Jul. 12, 2016, with an English translation.
Japanese Decision to Grant a Patent for Japanese Application No. 2017-514099, dated Oct. 26, 2017, with an English translation.
International Preliminary Report on Patentability and Written Opinion of the International Searching Authority (forms PCT/IB/373, PCT/ISA/237 and PCT/IB/326), dated Nov. 2, 2017, for corresponding International Application No. PCT/JP2016/062172, with translation of the Written Opinion.
International Preliminary Report on Patentability and Written Opinion of the International Searching Authority (forms PCT/IB/373, PCT/ISA/237 and PCT/IB/326), dated Nov. 2, 2017, for International Application No. PCT/JP2016/062173, with an English translation of the Written Opinion.
International Search Report (form PCT/ISA/210), dated Jun. 14, 2016, for International Application No. PCT/JP2016/062173, with an English translation.
International Search Report (form PCT/ISA/210), dated Jun. 7, 2016, for corresponding International Application No. PCT/JP2016/062172, with an English translation.
Japanese Decision to Grant a Patent, dated Nov. 7, 2017, for corresponding Japanese Application No. 2017-514102, with an English translation.
Japanese Decision to Grant a Patent, dated Nov. 7, 2017, for Japanese Application No. 2017-514103, with an English translation.
U.S. Notice of Allowance for U.S. Appl. No. 15/789,146, dated Feb. 21, 2019.
U.S. Notice of Allowance for U.S. Appl. No. 15/789,710, dated Mar. 11, 2019.

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

The present application is a Continuation of PCT International Application No. PCT/JP2016/062169 filed on Apr. 15, 2016 claiming priority under 35 U.S.C §119(a) to Japanese Patent Application No. 2015-088228 filed on Apr. 23, 2015. Each of the above applications is hereby expressly incorporated by reference, in their entirety, into the present application.

BACKGROUND OF THE INVENTION

1. Field of the Invention

The present invention relates to an image processing device, an imaging device, an image processing method, and an image processing program, and more particularly, to a technology for performing a point image restoration process on the basis of a point spread function on a visible light image and a near-infrared light image.

2. Description of the Related Art

A point spread phenomenon in which a point subject has small spread due to an influence such as diffraction or aberration caused by an optical system may be observed in a subject image captured via the optical system. A function representing a response of the optical system to a point light source is called a point spread function (PSF) and is known as a property that affects resolution degradation (bokeh) of a captured image.

By performing a point image restoration process based on the PSF on a captured image of which image quality has been degraded due to the point spread phenomenon, it is possible to recover (restore) the degraded image quality of a captured image. This point image restoration process is a process of obtaining degradation characteristics (point image characteristics) caused by aberration or the like of a lens (optical system) in advance and canceling or reducing point spread of a captured image through image processing using a point image restoration filter according to the point image characteristics.

Meanwhile, there is, for example, a surveillance camera as a camera having a day and night function capable of performing capturing of a visible light image during daytime and capturing of a near-infrared light image during nighttime. In the surveillance camera having the day and night function, an infrared cut filter is inserted into an imaging optical path of a lens and imaging (color imaging) is performed with sensitivity to only visible light during daytime, whereas the infrared cut filter is retracted from the imaging optical path, near-infrared light is emitted (lights up) as auxiliary light, and imaging (black and white imaging) is performed with sensitivity to a wavelength band from visible light to near-infrared light during nighttime.

In a case where the point image restoration process is applied to a visible light image and a near-infrared light image captured by the surveillance camera having the day and night function, there is a problem in that the point image restoration process for at least one of the visible light image and the near-infrared light image cannot be satisfactorily performed when the same point image restoration filter is used since aberration of the lens is different between the visible light and the near-infrared light.

JP2008-113704A describes a biometric authentication device that performs a plurality of authentications such as fingerprint authentication, vein authentication, and iris authentication. This biometric authentication device uses a depth of field extension optical system including an optical wavefront modulation element, radiates ultraviolet light suitable for emphasizing visible light or a fingerprint in fingerprint imaging at the time of fingerprint authentication, radiates infrared light suitable for emphasizing a blood vessel while passing through a skin in vein imaging at the time of vein authentication, and radiates visible light or infrared light in iris imaging at the time of iris authentication. Using the optical wavefront modulation element, a dispersed image is restored into an image with no dispersion through convolution (a convolution calculation) between the dispersed image (bokeh image) in which an optical image has been dispersed and a conversion coefficient corresponding to dispersion caused by the optical wavefront modulation element. In this restoration process, the conversion coefficient corresponding to the dispersion caused by the optical wavefront modulation element is changed according to a wavelength of light with which an imaging target (a fingerprint, a vein, or an iris) is irradiated.

Further, JP2010-230776A describes a focal position adjustment device that adjusts a focal position by moving a lens in an optical axis direction in a camera capable of simultaneously acquiring a visible light image and a near-infrared light image. This focal position adjustment device causes the lens to perform a search operation from the infinity side to the closest end side using focal position shift due to chromatic aberration (visible light and near-infrared light) of the lens to obtain a lens position (an in-focus position) at which an in-focus state evaluation value of the near-infrared light image becomes a minimum value, and further moves the lens to the closest side by the focal position shift due to chromatic aberration from the in-focus position, such that the lens can be moved to the in-focus position of the near-infrared light image in a short time.

SUMMARY OF THE INVENTION

In a case where the point image restoration process is applied to a visible light image and a near-infrared light image captured by the surveillance camera having the day and night function, since aberration of the lens is different between the visible light and the near-infrared light, it is preferable to switch between a point image restoration filter for visible light that is used for a point image restoration process of the visible light image and a point image restoration filter for near-infrared light that is used for a point image restoration process of the near-infrared light image.

However, actually, since there is time in which the visible light and the near-infrared light coexist at the time of switching from daytime to nighttime (so-called twilight state) and the time of switching from nighttime to daytime (so-called dawn state), the point image restoration cannot be satisfactorily performed even when any one of the point image restoration filter for visible light and the point image restoration filter for near-infrared light is used for the near-infrared light image captured in a twilight and dawn state.

JP2008-113704A discloses problems that a calculation coefficient for a restoration process (convolution calculation) is changed when each of the dispersed images of a visible light image and a near-infrared light image captured using a depth of field extension optical system having an optical wavefront modulation element is restored, and a focal length is different according to a wavelength of the visible light and the near-infrared light in a case where the visible light image and the near-infrared light image are captured using one imaging system, but does not disclose a configuration in which a subject is imaged under a light source (twilight or dawn) in which visible light and near-infrared light coexist, or a problem in a case where a point image restoration process is performed on a near-infrared light image captured at twilight or dawn.

Further, the focal position adjustment device described in JP2010-230776A performs contrast autofocus (AF) with high accuracy in a short time using the focal position shift due to the chromatic aberration (visible light and near-infrared light) of the lens in the camera capable of simultaneously acquiring a visible light image and a near-infrared light image. JP2010-230776A does not describe performing point image restoration on an originally captured visible light image or near-infrared light image, and does not disclose a problem in a case where the point image restoration process is performed on a near-infrared light image captured at twilight or dawn.

The present invention has been made in view of such circumstances, and an object thereof is to provide an image processing device, an imaging device, an image processing method, and an image processing program capable of satisfactorily performing a point image restoration process on a near-infrared light image that is captured in a time zone of twilight or dawn.

In order to accomplish the above object, an image processing device according to an aspect of the present invention includes an image acquisition unit that acquires image data including a near-infrared light image captured with sensitivity to a visible light wavelength band and a near-infrared light wavelength band using an optical system; a point image restoration processing unit that performs a point image restoration process on the acquired image data using a first point image restoration filter based on a first point spread function for visible light of the optical system and a second point image restoration filter based on a second point spread function for near-infrared light of the optical system; and a restoration rate control unit that controls the point image restoration processing unit to adjust a first restoration rate in the point image restoration process using the first point image restoration filter and a second restoration rate in the point image restoration process using the second point image restoration filter for the acquired image data, wherein the restoration rate control unit includes a light amount ratio detection unit that detects a light amount ratio between a first light amount by visible light and a second light amount by near-infrared light at the time of capturing the near-infrared light image, the restoration rate control unit adjusting the first restoration rate and the second restoration rate according to the detected light amount ratio.

According to an aspect of the present invention, in the case of image data in which a visible light component and a near-infrared light component coexist, the first restoration rate in the point image restoration process using the first point image restoration filter and the second restoration rate in the point image restoration process using the second point image restoration filter are adjusted according to the light amount ratio between the first light amount by the visible light and the second light amount by the near-infrared light at the time of capturing the near-infrared light image (that is, a ratio between the visible light component and the near-infrared light component included in the image data). Thus, it is possible to perform an appropriate point image restoration process on the image data that is captured in a time zone of twilight or dawn in which the visible light and the near-infrared light coexist.

In the image processing device according to another aspect of the present invention, it is preferable that the point image restoration processing unit applies the first point image restoration filter and the second point image restoration filter to the acquired image data to generate first increment or decrement data and second increment or decrement data, and adds the first increment or decrement data and the second increment or decrement data that have been generated to the image data, and the restoration rate control unit adjusts a first gain for the first increment or decrement data and a second gain for the second increment or decrement data according to the light amount ratio detected by the light amount ratio detection unit to adjust the first restoration rate and the second restoration rate.

In the image processing device according to still another aspect of the present invention, it is preferable that the restoration rate control unit acquires a total gain based on the first gain and the second gain, and adjusts a ratio between the first gain and the second gain in the acquired total gain according to the light amount ratio detected by the light amount ratio detection unit. By appropriately setting the total gain, it is possible to arbitrarily adjust point image restoration strength.

An image processing device according to still another aspect of the present invention includes: an image acquisition unit that acquires image data including the near-infrared light image captured with sensitivity to a visible light wavelength band and a near-infrared light wavelength band using an optical system; and a point image restoration processing unit that performs a point image restoration process on the acquired image data using a point image restoration filter based on a point spread function for visible light and near-infrared light of the optical system, wherein the point image restoration processing unit includes a light amount ratio detection unit that detects a light amount ratio between a first amount of light by the visible light and a second amount of light by the near-infrared light at the time of capturing the near-infrared light image when performing the point image restoration process using the point image restoration filter, the point image restoration processing unit performing the point image restoration process using the point image restoration filter based on the point spread function according to the detected light amount ratio.

According to still another aspect of the present invention, since the point image restoration process is performed on image data (image data including a visible light component and a near-infrared light component) using a point image restoration filter based on the point spread function for visible light and near-infrared light of the optical system (a point image restoration filter for near-infrared light at twilight and dawn), which is a point image restoration filter based on a point spread function according to the light amount ratio between the first amount of light by the visible light and the second amount of light by the near-infrared light at the time of capturing a near-infrared light image, it is possible to satisfactorily perform the point image restoration process on the image data captured in a time zone of twilight or dawn.

In the image processing device according to still another aspect of the present invention, it is preferable that the point image restoration processing unit includes a point spread function generation unit that generates the point spread function for visible light and near-infrared light of the optical system obtained by performing weighted averaging on a first point spread function for visible light of the optical system and a second point spread function for near-infrared light of the optical system according to the light amount ratio detected by the light amount ratio detection unit; and a point image restoration filter generation unit that generates the point image restoration filter on the basis of the generated point spread function, the point image restoration processing unit performing the point image restoration process using the generated point image restoration filter.

In the image processing device according to still another aspect of the present invention, it is preferable that the point image restoration processing unit includes a point spread function storage unit that stores a plurality of point spread functions corresponding to the light amount ratio detected by the light amount ratio detection unit; and a point image restoration filter generation unit that reads the point spread function corresponding to the light amount ratio detected by the light amount ratio detection unit from the point spread function storage unit, and generates the point image restoration filter from the read point spread function, and the point image restoration processing unit performing the point image restoration process using the generated point image restoration filter.

In the image processing device according to still another aspect of the present invention, it is preferable that the point image restoration processing unit includes a point image restoration filter storage unit that stores a plurality of point image restoration filters based on a plurality of point spread functions corresponding to the light amount ratio detected by the light amount ratio detection unit, the point image restoration processing unit reading the point image restoration filter corresponding to the light amount ratio detected by the light amount ratio detection unit from the point image restoration filter storage unit and performing the point image restoration process using the read point image restoration filter.

In the image processing device according to still another aspect of the present invention, it is preferable that the image data acquired by the image acquisition unit is continuously captured moving image data, and the light amount ratio detection unit measures the amount of light in an imaging period of a plurality of frames of the moving image data, and detects the light amount ratio between the first amount of light and the second amount of light on the basis of the measured amount of light. It is possible to increase reliability of the detection of the light amount ratio and to perform a stable point image restoration process on continuous moving image data.

In the image processing device according to still another aspect of the present invention, it is preferable that the image acquisition unit further acquires image data indicating a visible light image captured with sensitivity to a visible light wavelength band using the optical system, and the point image restoration processing unit performs the point image restoration process on the image data indicating the visible light image using the first point image restoration filter based on the first point spread function for the visible light of the optical system. Accordingly, it is possible to satisfactorily perform the point image restoration process of image data indicating a visible light image that is captured during daytime.

In the image processing device according to still another aspect of the present invention, it is preferable that the image data indicating the visible light image includes first color data, and second color data of two or more colors having a contribution rate for obtaining luminance data lower than that of the first color data, and the point image restoration processing unit performs the point image restoration process on the luminance data generated from the image data indicating the visible light image using the first point image restoration filter corresponding to the luminance data. Since the point image restoration process using the first point image restoration filter corresponding to the luminance data is performed on the luminance data generated from the image data indicating the visible light image as the point image restoration process for the image data indicating the visible light image, it is not necessary to perform the point image restoration process on the image data indicating the visible light image for each color channel, and it is possible to simplify a device configuration.

In the image processing device according to still another aspect of the present invention, it is preferable that the image data indicating the visible light image includes first color data, and second color data of two or more colors having a contribution rate for obtaining luminance data lower than that of the first color data, and the point image restoration processing unit performs the point image restoration process on the first color data and each of pieces of the second color data of two or more colors using the first point image restoration filter corresponding to each of the first color data and each of pieces of the second color data of two or more colors. Since the point image restoration process is performed on each color channel of the image data indicating the visible light image as the point image restoration process for the image data indicating the visible light image, it is possible to perform the point image restoration process of reducing lateral chromatic aberration.

In the image processing device according to still another aspect of the present invention, it is preferable that in a case where the acquired image data is image data of only a near-infrared light component, the point image restoration processing unit performs only a point image restoration process on the image data of only the near-infrared light component using a second point image restoration filter based on a second point spread function for the near-infrared light of the optical system.

Accordingly, it is possible to satisfactorily perform the point image restoration process on the image data of only the near-infrared light component that is captured in nighttime. A case where the acquired image data is the image data of only the near-infrared light component is, for example, a case where a light amount ratio of the visible light detected by the light amount ratio detection unit is very low. The amount of visible light is not limited to 0 and is 10% or less, preferably 5% or less, and more preferably, 3% or less of the total amount of light.

An imaging device according to still another aspect of the present invention includes: the image processing device; and a near-infrared light emitting unit that emits near-infrared light as auxiliary light at the time of capturing the near-infrared light image.

In the imaging device according to still another aspect of the present invention, the optical system is an optical system in which an infrared cut filter is insertable into an imaging optical path or retractable from the imaging optical path, and the image acquisition unit is an imaging unit that images a subject using the optical system in which the infrared cut filter is inserted into the imaging optical path to acquire image data indicating the visible light image of the subject, causes near-infrared light to be emitted from the near-infrared light emitting unit, and images the subject using the optical system in which the infrared cut filter is retracted from the imaging optical path to acquire image data indicating the near-infrared light image of the subject.

In the imaging device according to still another aspect of the present invention, the image acquisition unit is an imaging unit that includes an imaging element in which a first pixel for capturing a visible light image with sensitivity to the visible light wavelength band and a second pixel for capturing a near-infrared light image with sensitivity to the visible light wavelength band and the near-infrared light wavelength band coexist and are arranged, acquires image data indicating the visible light image of a subject using the optical system and the first pixel of the imaging element, causes the near-infrared light to be emitted from the near-infrared light emitting unit, and acquires the image data indicating the near-infrared light image of the subject using the optical system and the second pixel of the imaging element. In the case of the imaging device having this imaging element, an infrared cut filter and a configuration that loads and unloads the infrared cut filter are unnecessary.

An image processing method according to still another aspect of the present invention includes a step of acquiring image data including a near-infrared light image captured with sensitivity to a visible light wavelength band and a near-infrared light wavelength band using an optical system; a step of performing a point image restoration process on the acquired image data using a first point image restoration filter based on a first point spread function for visible light of the optical system and a second point image restoration filter based on a second point spread function for near-infrared light of the optical system; and a step of controlling the point image restoration process to adjust a first restoration rate in the point image restoration process using the first point image restoration filter and a second restoration rate in the point image restoration process using the second point image restoration filter for the acquired image data, the step including detecting a light amount ratio between a first light amount by visible light and a second light amount by near-infrared light at the time of capturing the near-infrared light image, and adjusting the first restoration rate and the second restoration rate according to the detected light amount ratio.

An image processing method according to still another aspect of the present invention includes a step of acquiring image data including a near-infrared light image captured with sensitivity to a visible light wavelength band and a near-infrared light wavelength band using an optical system; and a step of performing a point image restoration process on the acquired image data using a point image restoration filter based on a point spread function for visible light and near-infrared light of the optical system, wherein a step of performing the point image restoration process on the acquired image data, the acquired image data being captured under a light source in which visible light and near-infrared light coexist using the point image restoration filter, includes detecting a light amount ratio between a first light amount by visible light and a second light amount by near-infrared light at the time of capturing the near-infrared light image, and performing the point image restoration process using the point image restoration filter based on the point spread function according to the detected light amount ratio.

An image processing program according to still another aspect of the present invention causes a computer to execute: a step of acquiring image data including a near-infrared light image captured with sensitivity to a visible light wavelength band and a near-infrared light wavelength band using an optical system; a step of performing a point image restoration process on the acquired image data using a first point image restoration filter based on a first point spread function for visible light of the optical system and a second point image restoration filter based on a second point spread function for near-infrared light of the optical system; and a step of controlling the point image restoration process to adjust a first restoration rate in the point image restoration process using the first point image restoration filter and a second restoration rate in the point image restoration process using the second point image restoration filter for the acquired image data, the step including detecting a light amount ratio between a first light amount by visible light and a second light amount by near-infrared light at the time of capturing the near-infrared light image, and adjusting the first restoration rate and the second restoration rate according to the detected light amount ratio.

An image processing program according to still another aspect of the present invention causes a computer to execute: a step of acquiring image data including a near-infrared light image captured with sensitivity to a visible light wavelength band and a near-infrared light wavelength band using an optical system; and a step of performing a point image restoration process on the acquired image data using a point image restoration filter based on a point spread function for visible light and near-infrared light of the optical system, wherein a step of performing the point image restoration process on the acquired image data, the acquired image data being captured under a light source in which visible light and near-infrared light coexist using the point image restoration filter, includes detecting a light amount ratio between a first light amount by visible light and a second light amount by near-infrared light at the time of capturing the near-infrared light image, and performing the point image restoration process using the point image restoration filter based on the point spread function according to the detected light amount ratio. A non-transitory computer-readable tangible medium having the image processing program recorded thereon.

According to the present invention, since the point image restoration process according to the light amount ratio between the amount of visible light and the amount of near-infrared light is performed on the near-infrared light image captured in a twilight or dawn state in which a visible light component and a near-infrared light component coexist, it is possible to perform a good point image restoration process on the near-infrared light image captured in the twilight or dawn state.

DESCRIPTION OF THE PREFERRED EMBODIMENTS

Hereinafter, embodiments of an image processing device, an imaging device, an image processing method, and an image processing program according to the present invention will be described with reference to the accompanying drawings. In the following embodiments, a case where the present invention is applied to an imaging device that is used as a surveillance camera connectable to a computer (PC: Personal Computer) will be described by way of example.

Figure 1:
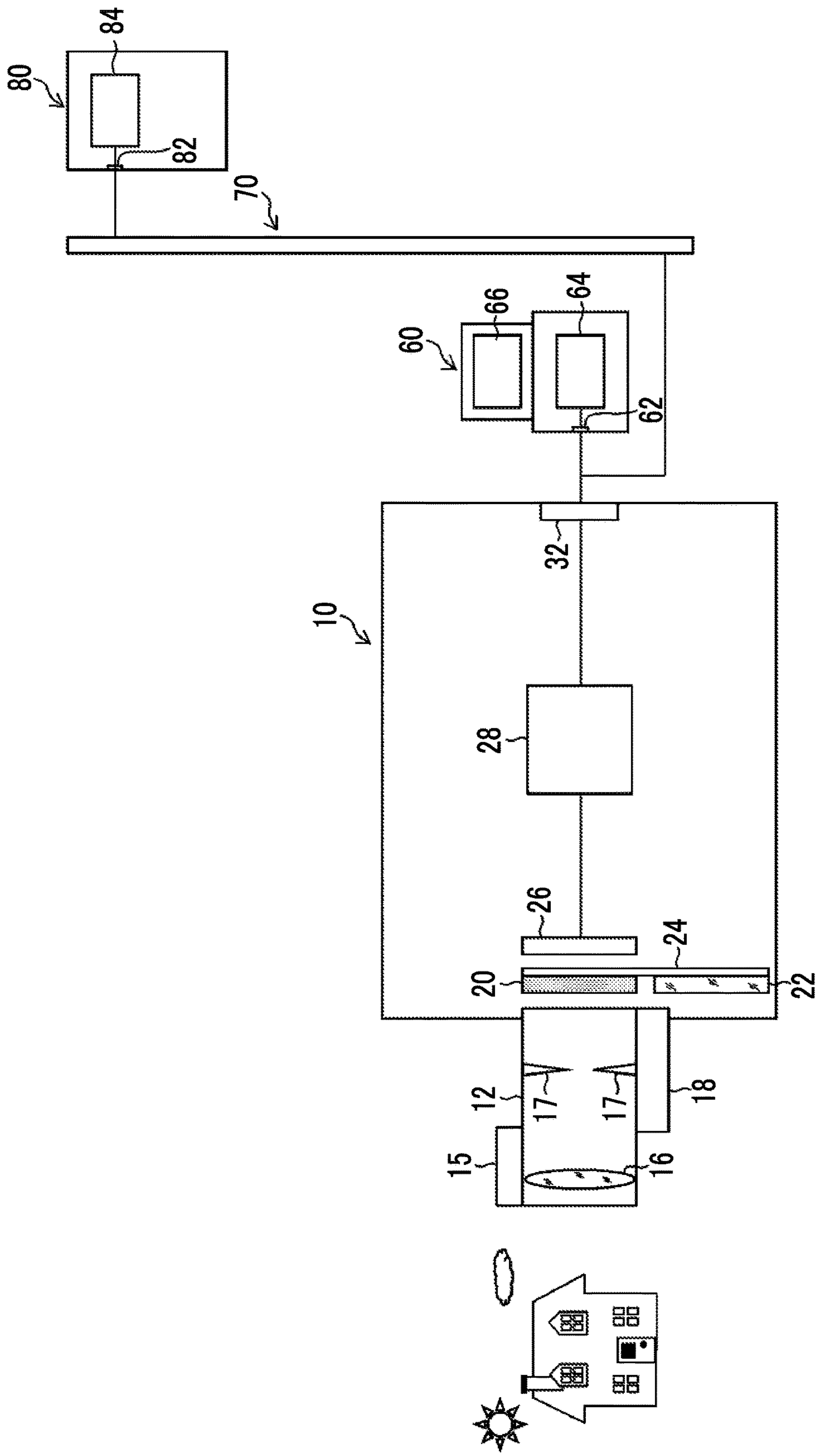
FIG. 1 is a block diagram illustrating a functional configuration example of an imaging device, and is a diagram illustrating a case where a visible light image (moving image) is captured during daytime.
Figure 2:
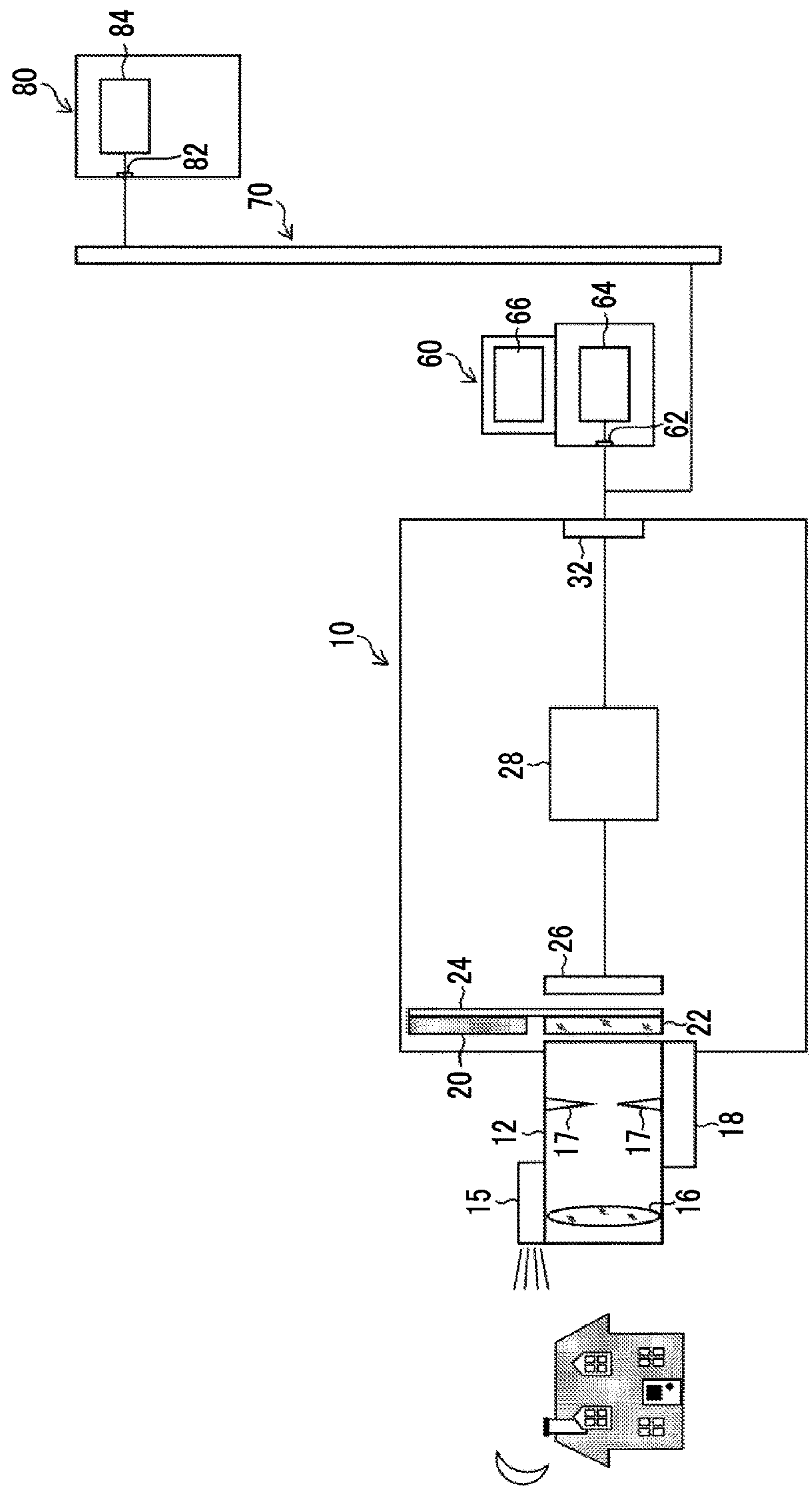
FIG. 2 is a block diagram illustrating a functional configuration example of an imaging device, and is a diagram illustrating a case where a near-infrared light image (moving image) is captured at twilight and nighttime.

FIGS. 1 and 2 are block diagrams each illustrating a functional configuration example of an imaging device 10 that is connected to a computer. FIG. 1 illustrates a case where a visible light image (a moving image) during the daytime is captured by the imaging device 10, and FIG. 2 illustrates a case where a near-infrared light image (a moving image) during twilight and nighttime is captured by the imaging device 10.

The imaging device 10 illustrated in FIGS. 1 and 2 is a surveillance camera on which a day and night function is mounted, and includes a visible light image capturing mode for capturing a visible light image and a near-infrared light image capturing mode for capturing a near-infrared light image.

As illustrated in FIGS. 1 and 2, the imaging device 10 mainly includes a lens unit 12, a near-infrared light emitting unit 15, a filter device 24, and an imaging element (an image acquisition unit) 26 that constitute an imaging unit, a camera controller 28, and an input/output interface 32.

The lens unit 12 includes an optical system such as a lens 16 and an aperture 17, and an optical system operation unit 18 that controls the optical system. The optical system operation unit 18 includes a manual operation unit that adjusts a focus position of the lens 16, and an aperture drive unit that drives the aperture 17 using a control signal applied from the camera controller 28.

Figure 3:
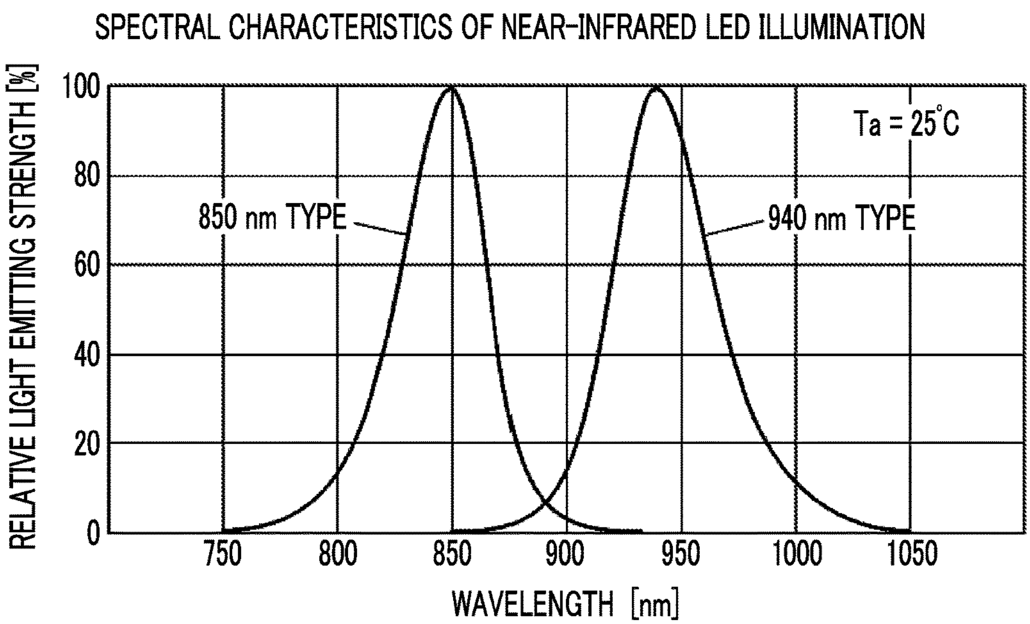
FIG. 3 is a graph showing spectral characteristics of a near-infrared LED of an 850 nm type and a near-infrared LED of a 940 nm type.

The near-infrared light emitting unit 15 includes a near-infrared light emitting diode (near-infrared LED), and continuously emits (radiates) near-infrared light as auxiliary light according to a lighting command applied from the camera controller 28 in the near-infrared light image capturing mode, as illustrated in FIG. 2. The near-infrared LED includes a near-infrared LED having spectral characteristics of an 850 nm type and a near-infrared LED having spectral characteristics of a 940 nm type as illustrated in FIG. 3, both of which can be used as a light source of the near-infrared light emitting unit 15.

In the filter device 24, by moving a slide plate including an infrared cut filter 20 and a dummy glass 22 in a direction perpendicular to an optical axis or rotating a turret including the infrared cut filter 20 and the dummy glass 22, the infrared cut filter 20 is inserted into or retracted from the imaging optical path and the dummy glass 22 is retracted from or inserted into the imaging optical path. According to a command applied from the camera controller 28, the infrared cut filter 20 is inserted into the imaging optical path in the visible light image capturing mode (FIG. 1) and the dummy glass 22 is inserted into the imaging optical path in the near-infrared light image capturing mode (FIG. 2).

Here, the dummy glass 22 preferably has the same refractive index and thickness as the infrared cut filter 20. Thus, a focal position does not fluctuate even when switching between the infrared cut filter 20 and the dummy glass 22 can be performed.

The imaging element 26 includes a complementary metal-oxide semiconductor (CMOS) type color image sensor. The imaging element 26 is not limited to the CMOS type and may be an XY address type or charge coupled device (CCD) type image sensor.

Figure 4A:
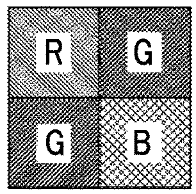
FIGS. 4A and 4B are a diagram illustrating a basic arrangement pattern of a Bayer array and a diagram illustrating spectral transmittance characteristics of each color filter of RGB.

The imaging element 26 includes a plurality of pixels arranged in a matrix form, and each pixel includes a microlens, a red (R), green (G), or blue (B) color filter, and a photoelectric conversion unit (such as a photodiode). The RGB color filters have a filter array in a predetermined pattern (such as a Bayer array or an X-Trans (registered trademark) array). FIG. 4A illustrates a basic array pattern of the Bayer array.

Figure 4B:
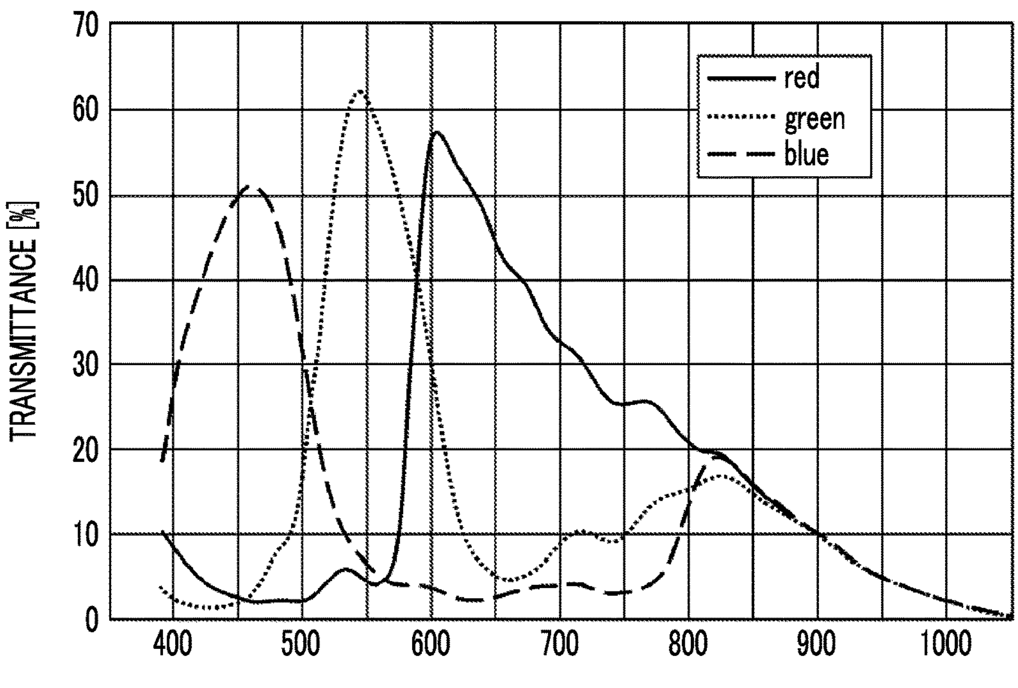

FIG. 4B illustrates spectral transmittance characteristics of the respective color filters of RGB. Pixels having respective color filters of RGB (hereinafter, an R pixel, a G pixel, and a B pixel) have substantially the same sensitivity to the near-infrared light (see FIG. 3) of the near-infrared LED having spectral characteristics of an 850 nm type or a 940 nm type, as illustrated in FIG. 4B. Thus, in the near-infrared light image capturing mode, the R pixel, the G pixel, and the B pixel of the imaging element 26 function as near-infrared light pixels (IR (infrared) pixels), respectively.

That is, at the time of imaging in the visible light image capturing mode, image data indicating the visible light image, which is mosaic data corresponding to the filter array of the RGB color filter (mosaic color data (RGB data) of red (R), green (G), and blue (B)), is output from the imaging element 26. At the time of imaging in the near-infrared light image capturing mode, image data indicating the near-infrared light image, which is near-infrared light image data (IR data) representing a black and white image of single screen, is output from the imaging element 26.

The camera controller 28 has a function as a device control unit 34 that generally controls each unit of the imaging device 10, and a function as an image processing unit (an image processing device) 35 that performs image processing of the image data (image data indicating the visible light image captured in the visible light image capturing mode or image data indicating the near-infrared light image captured in the near-infrared light image capturing mode) sent from the imaging element 26, although will be described in detail below.

In the camera controller 28, the image data subjected to image processing is stored in a storage unit (not illustrated) provided in the imaging device 10 and/or is sent to a computer 60 or the like via an input and output interface 32. A format of the image data output from the camera controller 28 is not particularly limited, and may be a format such as Moving Picture Experts Group (MPEG) or H.264 in the case of a moving image and may be a format such as Joint Photographic Experts Group (JPEG) or Tagged Image File Format (TIFF) in the case of a still image. Further, raw data (RAW data) not subjected to image processing by the image processing unit 35 may be output. Further, the camera controller 28 may associate header information (imaging date and time, model, number of pixels, an aperture value, or the like), main image data, and a plurality of related data such as thumbnail image data with one another to constitute one image file, as in a so-called Exchangeable Image File Format (Exif), and output the image file.

The computer 60 is connected to the imaging device 10 via the input and output interface 32 of the imaging device 10 and a computer input and output unit 62, and receives data such as the image data sent from the imaging device 10. A computer controller 64 controls the entire computer 60, performs image processing on the image data from the imaging device 10, and controls communication with a server 80 or the like connected to the computer input and output unit 62 via a network line such as the Internet 70. The computer 60 has a display 66, and processing content or the like in the computer controller 64 is displayed on the display 66, as necessary. A user can operate an input means (not illustrated) such as a keyboard while confirming the display on the display 66 to input data or commands to the computer controller 64. Thus, the user can control the computer 60 or devices (the imaging device 10 and the server 80) connected to the computer 60.

The server 80 includes a server input and output unit 82 and a server controller 84. The server input and output unit 82 constitutes a transmission and reception connection unit with respect to an external device such as the computer 60, and is connected to the computer input and output unit 62 of the computer 60 via a network line such as the Internet 70. The server controller 84 performs transmission and reception of data to and from the computer controller 64 in cooperation with the computer controller 64 in response to a control command signal from the computer 60, as necessary, to download the data to the computer 60, and performs a calculation process to transmit a result of the calculation to the computer 60.

Each controller (the camera controller 28, the computer controller 64, or the server controller 84) includes a circuit necessary for a control process and includes, for example, a central processing device (such as a central processing unit (CPU)) or a memory. Communication between the imaging device 10, the computer 60, and the server 80 may be wired communication or may be wireless communication. Further, the computer 60 and the server 80 may be integrally configured or the computer 60 and/or the server 80 may be omitted. Further, the imaging device 10 may have a function of communication with the server 80 such that direct transmission and reception of data may be performed between the imaging device 10 and the server 80. Further, the RAW data may be transmitted from the imaging device 10 to the computer 60 or the server 80, and an image processing unit (an image processing device) of the computer 60 or the server 80 may function as the image processing unit 35 (FIG. 5) in the camera controller 28 to perform image processing on the input RAW data.

[Image Processing Device]

First Embodiment of Image Processing Device

Figure 5:
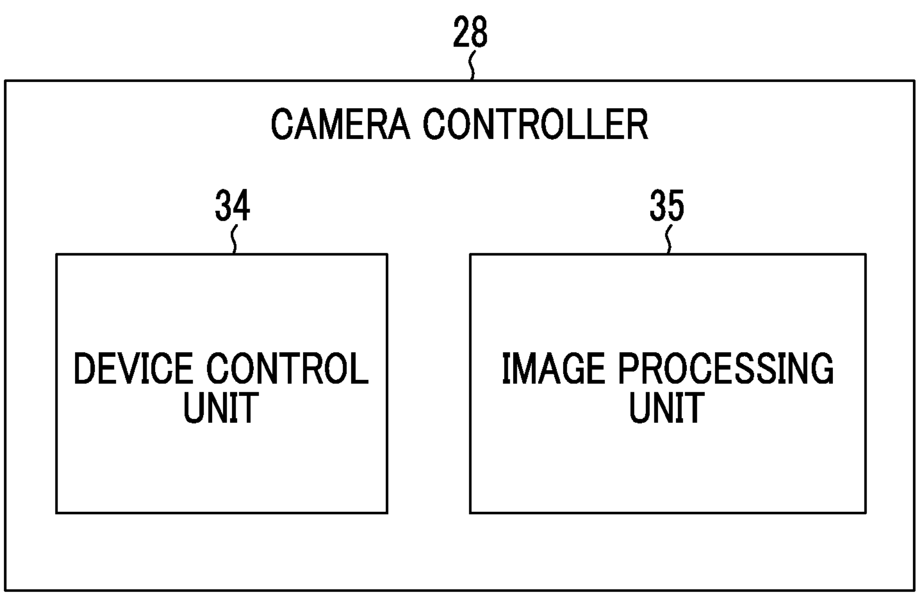
FIG. 5 is a block diagram illustrating a configuration example of a camera controller.
Figure 6:
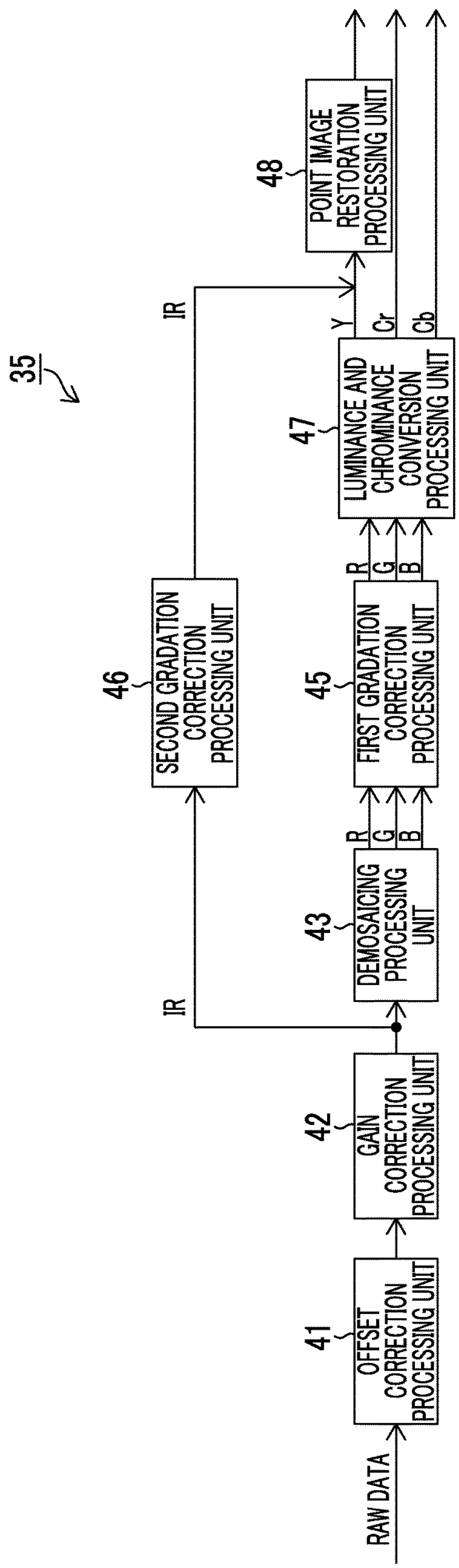
FIG. 6 is a block diagram illustrating a first embodiment of an image processing unit in a camera controller.

FIG. 6 is a block diagram illustrating a first embodiment of the image processing unit 35 in the camera controller 28 illustrated in FIG. 5.

The image processing unit 35 of the first embodiment illustrated in FIG. 6 includes an offset correction processing unit 41, a gain correction processing unit 42, a demosaicing processing unit 43, a first gradation correction processing unit 45 including a gamma correction processing unit, a second gradation correction processing unit 46, a luminance and chrominance conversion processing unit 47, and a point image restoration processing unit 48.

The offset correction processing unit 41 point-sequentially receives the RAW data before image processing (mosaic RGB data, or IR data) acquired from the imaging element 26. The RAW data is, for example, data having a bit length of 12 bits (0 to 4095) (2-byte data for one pixel) for each of RGB. Further, the RAW data in this example is continuously captured moving image data.

The offset correction processing unit 41 is a processing unit that corrects a dark current component included in the input RAW data, and performs offset correction of the RAW data by subtracting an optical black area signal value obtained from light-shielded pixels on the imaging element 26 from the RAW data.

The RAW data subjected to the offset correction is applied to the gain correction processing unit 42. In a case where the RAW data is RGB data, the gain correction processing unit 42 functions as a WB correction processing unit that adjusts white balance (WB) and multiplies RGB data by a WB gain set for each of RGB to perform white balance correction of the RGB data. For the WB gain, for example, a type of light source is automatically determined on the basis of the RGB data or the type of light source is manually selected, and the WB gain suitable for the determined or selected type of light source is set, but a WB gain setting method is not limited thereto and the WB gain may be set using other known methods.

Further, in a case where the RAW data is IR data, the gain correction processing unit 42 functions as sensitivity correction processing unit that corrects a difference in sensitivity among the R pixel, the G pixel, and the B pixel to the near-infrared light. The gain correction processing unit 42 multiplies the IR data corresponding to the R pixel, the G pixel, and the B pixel by a gain for causing integrated average values of IR data output from the R pixel, G pixel, and the B pixel to be 1:1:1 to correct the IR data. In a case where there is no difference in sensitivity to the near-infrared light in the R pixel, the G pixel, and the B pixel, the correction of the sensitivity difference in the gain correction processing unit 42 is unnecessary.

The demosaicing processing unit 43 is a unit that performs demosaicing process (also referred to as a "synchronization process") for calculating all pieces of color information for the respective pixels from a mosaic image corresponding to the color filter array of the imaging element 26 of a single plate type. For example, in a case of an imaging element including color filters for three colors RGB, color information of all of RGB for the respective pixels is calculated from the mosaic image including RGB. That is, the demosaicing processing unit 43 generates image data of three surfaces of RGB that are synchronized from the mosaic data (point-sequential RGB data). Demosaic processing in the demosaicing processing unit 43 is not performed on the IR data.

The RGB data subjected to demosaicing process is applied to the first gradation correction processing unit 45. The first gradation correction processing unit 45 is a unit that performs non-linear gradation correction on the RGB data. The first gradation correction processing unit 45 performs, for example, a gamma correction process using logarithmic processing on the input RGB data, and performs nonlinear processing on the RGB data so that an image is naturally reproduced by a display device.

In this example, the first gradation correction processing unit 45 performs gamma correction corresponding to gamma characteristics on the RGB data of 12 bits (0 to 4095) to generate RGB color data of 8 bits (0 to 255) (1-byte data). The first gradation correction processing unit 45 can include, for example, a look-up table for each of RGB and preferably performs gamma correction corresponding to each color of the RGB data. The first gradation correction processing unit 45 performs nonlinear gradation correction according to a tone curve on the input data.

The RGB data subjected to the gradation correction by the first gradation correction processing unit 45 is applied to the luminance and chrominance conversion processing unit 47. The luminance and chrominance conversion processing unit 47 is a processing unit that converts first color data (G data) and second color data (R data and B data) of two or more colors having a contribution rate for obtaining luminance data lower than the first color data (G data) into luminance data Y indicating a luminance component and chrominance data Cr and Cb, and can calculate the data using the following equation.

$$Y=0.299R+0.587G+0.114B$$

$$Cb=-0.168736R-0.331264G+0.5B$$

$$Cr=-0.5R-0.418688G-0.081312B \quad \text{[General Formula 1]}$$

A conversion equation from the RGB data to the luminance data Y and the chrominance data Cr and Cb is not limited to General Formula 1 above.

The luminance data Y converted from the RGB data by the luminance and chrominance conversion processing unit 47 is applied to the point image restoration processing unit 48.

On the other hand, the IR data subjected to the sensitivity correction by the gain correction processing unit 42 in the near-infrared light image capturing mode is applied to the second gradation correction processing unit 46, in which the same gradation correction as the gradation correction process in the first gradation correction processing unit 45 is performed. That is, the second gradation correction processing unit 46 can include a look-up table for IR, and performs gamma correction corresponding to gamma characteristics on the input 12-bit IR data to generate 8-bit IR data. Since the first gradation correction processing unit 45 and the second gradation correction processing unit 46 are different in the look-up table for gradation correction and are the same in others, a common processing circuit can be used.

The IR data subjected to the gradation correction by the second gradation correction processing unit 46 is applied to the point image restoration processing unit 48.

The luminance data Y or the IR data is input to the point image restoration processing unit 48 according to the imaging mode (the visible light image capturing mode or the near-infrared light image capturing mode), and the point image restoration processing unit 48 performs a point image restoration process on the input luminance data Y or the IR data.

[Point Image Restoration Processing Unit]

First Embodiment of Point Image Restoration Processing Unit

Next, a first embodiment of the point image restoration processing unit 48 illustrated in FIG. 6 will be described.

Figure 7:
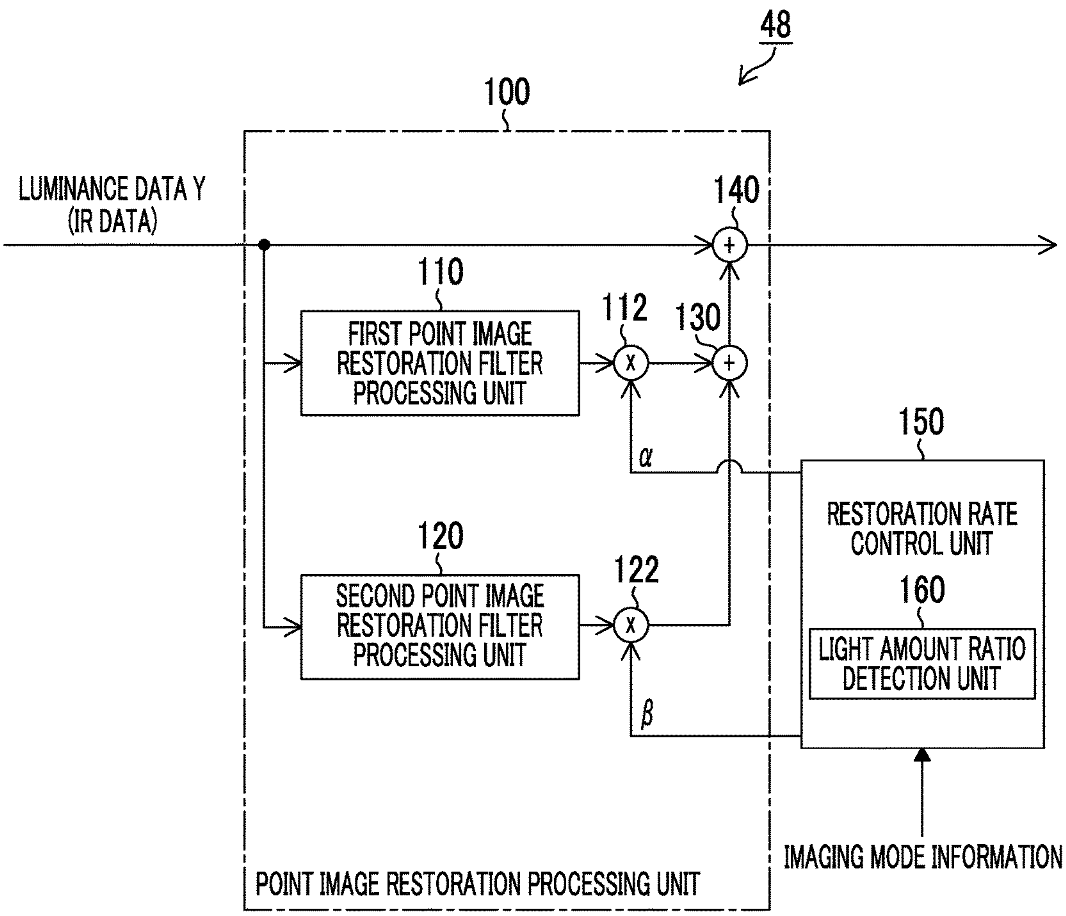
FIG. 7 is a block diagram illustrating a point image restoration processing unit according to the first embodiment.

FIG. 7 is a block diagram illustrating the point image restoration processing unit 48 of the first embodiment. The point image restoration processing unit 48 of the first embodiment mainly includes a point image restoration processing unit 100 including a first point image restoration filter processing unit 110, a second point image restoration filter processing unit 120, multipliers 112 and 122, and adders 130 and 140, and a restoration rate control unit 150.

The first point image restoration filter processing unit 110 applies a first point image restoration filter based on the first point spread function for visible light of an optical system (the lens 16 or the like) to the input image data (the luminance data Y or the IR data) according to the imaging mode to generate increment or decrement data (first increment or decrement data) of the image data subjected to the point image restoration process.

The multiplier 112 performs multiplication of a first gain $\alpha$ on the first increment or decrement data generated by the first point image restoration filter processing unit 110 and performs gain control of the first increment or decrement data (adjustment of the first restoration rate through the point image restoration process). The first increment or decrement data subjected to the gain control by the multiplier 112 is output to the adder 130.

On the other hand, the second point image restoration filter processing unit 120 applies a second point image restoration filter based on the second point spread function for near-infrared light of an optical system (the lens 16 or the like) to the input IR data according to the imaging mode to generate increment or decrement data (second increment or decrement data) of the IR data subjected to the point image restoration process.

The multiplier 122 performs multiplication of a second gain $\beta$ on the second increment or decrement data generated by the second point image restoration filter processing unit 120 and performs gain control of the second increment or decrement data (adjustment of the second restoration rate through the point image restoration process). The second increment or decrement data subjected to the gain control by the multiplier 122 is output to the adder 130.

The adder 130 adds the first increment or decrement data subjected to the gain control by the multiplier 112 to the second increment or decrement data subjected to the gain control by the multiplier 122, and outputs the increment or decrement data obtained by the addition to the adder 140.

The luminance data Y or the IR data is applied to the other input of the adder 140 according to the imaging mode, and the adder 140 adds the input luminance data Y or IR data to the increment or decrement data applied from the adder 130. Thus, the luminance data Y or the IR data subjected to the point image restoration process is output from the adder 140.

Next, the first gain α and the second gain β that are applied to the multipliers 112 and 122, respectively, will be described.

In the imaging mode of the near-infrared light image capturing mode and a twilight state that is a switching period from daytime to nighttime, a subject is irradiated with light (sunlight) around the subject, in addition to the near-infrared light emitted from the near-infrared light emitting unit 15. The imaging element 26 performs imaging with sensitivity to a visible light wavelength band in the visible light image capturing mode in which the infrared cut filter 20 is inserted into the imaging optical path, but performs imaging with sensitivity to the visible light wavelength band and a near-infrared light wavelength band when the imaging mode is switched to the near-infrared light image capturing mode and the infrared cut filter 20 is retracted from the imaging optical path. Thus, the near-infrared light component is included in the IR data captured in the twilight state, in addition to the visible light component, and an intermediate point image restoration process between the point image restoration process for the visible light and the point image restoration process for the near-infrared light is performed on the IR data captured in a twilight state such that a good point image restoration process can be performed.

The restoration rate control unit 150 mainly adjusts weights of the first gain α and the second gain β according to the state of twilight for the IR data captured in the twilight state, and outputs the gains to the multipliers 112 and 122, respectively.

Figure 8:
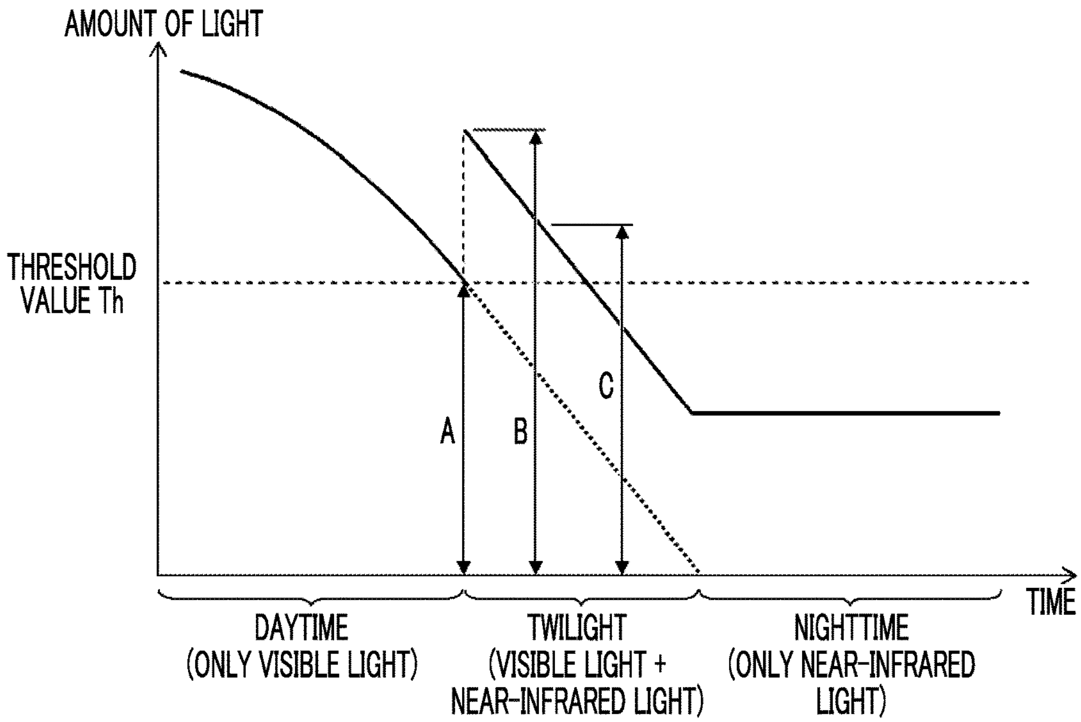
FIG. 8 is a graph showing a change in brightness (amount of light) of a subject with elapse of time from daytime through nighttime.

FIG. 8 is a graph showing a change in brightness (amount of light) of the subject with elapse of time from daytime to nighttime.

As illustrated in FIG. 8, the amount of light of the subject (the amount of sunlight) gradually decreases with elapse of time from daytime to nighttime, and becomes zero at nighttime.

When the amount of light of the subject is smaller than the threshold value Th (the amount of light for discriminating a boundary between the daytime and the twilight), the imaging mode is switched from the visible light image capturing mode to the near-infrared light image capturing mode, and capturing of the near-infrared light image is performed. That is, during the daytime, the imaging mode is switched to the visible light image capturing mode, and during twilight and nighttime, the imaging mode is switched to the near-infrared light image capturing mode.

Since the camera controller 28 detects brightness (an exposure value (EV value)) of the subject when performing automatic exposure control through control of the aperture 17 or control of a shutter speed (charge storage time of the imaging element 26), the detected EV value can be used as the amount of light (brightness) of the subject. When the detected EV value is smaller than the threshold value Th, the camera controller 28 switches the imaging mode from the visible light image capturing mode to the near-infrared light image capturing mode.

In the near-infrared light image capturing mode, the dummy glass 22 is inserted into the imaging optical path in place of the infrared cut filter 20 as illustrated in FIG. 2, the near-infrared light emitting unit 15 is turned on, and near-infrared light is emitted from the near-infrared light emitting unit 15.

Thus, when the imaging mode is switched to the near-infrared light image capturing mode, the amount of light of the subject is increased by the amount of near-infrared light with which the subject is irradiated from the near-infrared light emitting unit 15, as illustrated in FIG. 8.

In FIG. 8, when the amount of light when the amount of light becomes smaller than the threshold value Th for the first time is A, the amount of light at a point in time at which switching occurs from the visible light image capturing mode to the near-infrared light image capturing mode is B, and the amount of light of an arbitrary point in time in a twilight state is C, the amount of light obtained by subtracting the amount of light A from the amount of light B (amount of light B−amount of light A) is the amount of light corresponding to the near-infrared light with which the subject is irradiated from the near-infrared light emitting unit 15, and has a constant value. Accordingly, the amount of light at night becomes a constant amount of light due to only the near-infrared light.

Further, the amount of light of the visible light in the twilight state is the amount of light (amount of light C−(amount of light B−amount of light A)) obtained by subtracting the constant amount of light (amount of light B−amount of light A) due to only the near-infrared light from the amount of light C.

Referring back to FIG. 7, the restoration rate control unit 150 includes a light amount ratio detection unit 160. Further, imaging mode information indicating whether the imaging mode is a visible light image capturing mode or the near-infrared light image capturing mode from the camera controller 28, and the light amount data (for example, an EV value) of the subject (not illustrated) are applied to the restoration rate control unit 150, and the light amount ratio detection unit 160 is operable when the imaging mode is the near-infrared light image capturing mode, and detects the light amount ratio between the amount of light (first amount of light) of the visible light and the amount of light (second amount of light) of the near-infrared light in the twilight state on the basis of the input light amount data.

That is, the light amount ratio detection unit 160 stores the light amount data (amount of light A) when the input light amount data becomes smaller than the threshold value Th for the first time, and the light amount data (the amount of light B) at a point in time at which the imaging mode is switched to the infrared light image capturing mode, and then, detects the light amount ratio between the amount of visible light (amount of light C−(amount of light B−amount of light A)) in the twilight state and the amount of light (amount of light B−amount of light A) of the near-infrared light on the basis of light amount data (the amount of light C) to be input in real time.

The restoration rate control unit 150 adjusts the ratio between the first gain α and the second gain β on the basis of the light amount ratio detected by the light amount ratio detection unit 160. Specifically, when the light amount ratio between the amount of visible light and the amount of near-infrared light is x/y, the ratio between the first gain α and the second gain β is α/β. Further, a sum (α+β) of the first gain α and the second gain β is set to 1. That is, β=1−α.

Thus, since the restoration rate control unit 150 adjusts the weights of the first gain α and the second gain β according to the twilight state (the light amount ratio between the amount of light of the visible light and the amount of light of the near-infrared light) for the IR data captured in the twilight state, and outputs the first gain α and the second gain β to the multipliers 112 and 122, it is possible to perform the intermediate point image restoration process between the point image restoration process for the visible light and the point image restoration process for the near-infrared light and to perform a good point image restoration process on the IR data in the twilight state.

In the case of the visible light image capturing mode during the daytime, the first gain α and the second gain β are α=1 and β=0, respectively, and the point image restoration process (a first point image restoration process) using the first point image restoration filter based on the first point spread function for visible light of the optical system (the lens 16) is performed on the luminance data Y. Similarly, in the case of the near-infrared light image capturing mode at nighttime, the first gain α and the second gain β are α=0 and β=1, respectively, and the point image restoration process using the second point image restoration filter based on the second point spread function for near-infrared light of the optical system (the lens 16) is performed on the IR data. Further, in the case of the visible light image capturing mode during the daytime, the second point image restoration filter processing unit 120 may be turned off instead of the second gain β being set to zero. On the other hand, in the case of the near-infrared light image capturing mode at nighttime, the first point image restoration filter processing unit 110 may be turned off instead of the first gain α being set to zero.

First Embodiment of Image Processing Method

Figure 9:
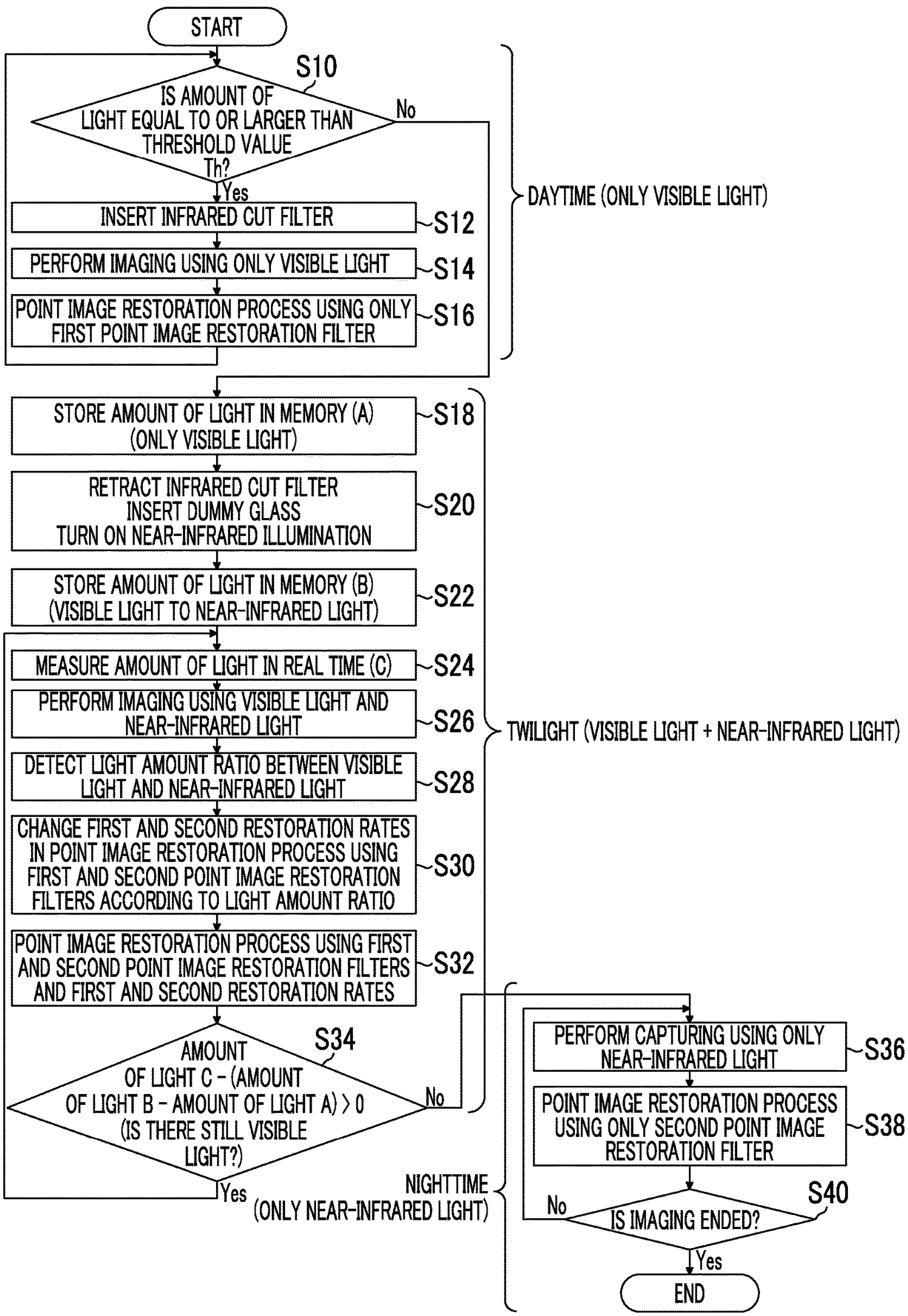
FIG. 9 is a flowchart illustrating the first embodiment of an image processing method.

FIG. 9 is a flowchart illustrating a first embodiment of the image processing method according to the present invention, and illustrates a point image restoration processing operation in the point image restoration processing unit 48 of the first embodiment illustrated in FIG. 7.

In FIG. 9, the camera controller 28 detects the amount of light (for example, an EV value) of the subject, and discriminates whether the detected amount of light is equal to or larger than a threshold value Th (step S10). In a case where the detected amount of light is equal to or larger than the threshold value Th ("Yes"), the process proceeds to step S12 to switch the imaging mode to the visible light image capturing mode that is an imaging mode during daytime, and in a case where the detected amount of light is smaller than the threshold value Th ("No"), the process proceeds to step S18 to switch the imaging mode to the near-infrared light image capturing mode that is an imaging mode at twilight and nighttime.

In step S12, the infrared cut filter 20 is inserted into the imaging optical path, and imaging (capturing of the visible light image) using only the visible light having sensitivity to a visible light wavelength band is performed in step S14. The luminance data Y of the captured visible light image is subjected to the point image restoration process using only the first point image restoration filter based on the first point image restoration filter processing unit 110, the multiplier 112, and the adders 130 and 140 (step S16).

On the other hand, in step S10, in a case where the detected amount of light is smaller than the threshold value Th ("No"), the amount of light when the amount of light becomes smaller than the threshold value Th for the first time is temporarily stored as amount of light A in a memory of the camera controller 28 (Step S18). Since the amount of light A and the threshold value Th are substantially the same, the threshold value Th may be stored as the amount of light A.

Subsequently, the camera controller 28 retracts the infrared cut filter 20, inserts the dummy glass 22 into the imaging optical path, turns on the near-infrared light emitting unit 15, and irradiates the subject with near-infrared light (step S20). When the imaging mode is switched from the visible light image capturing mode to the near-infrared light image capturing mode in step S20, the amount of light of the subject detected immediately after the switching is temporarily stored as amount of light B in the memory of the camera controller 28 (step S22).

Then, the amount of light is measured in real time, the measured amount of light is set as amount of light C (step S24), and capturing of the near-infrared light image is performed in a twilight state (under a light source in which the visible light and the near-infrared light coexist) (step S26). Then, the light amount ratio detection unit 160 detects a light amount ratio between the visible light and the near-infrared light on the basis of the amount of light A stored in step S18, the amount of light B stored in step S22, and the amount of light C measured in step S24 (step S28).

A first restoration rate of the point image restoration process in the first point image restoration filter and a second restoration rate of the point image restoration process in the second point image restoration filter are adjusted according to the light amount ratio detected in step S28 (step S30). That is, the restoration rate control unit 150 adjusts a ratio between the first gain α and the second gain β on the basis of the light amount ratio detected in step S22.

The point image restoration process using the first restoration rate and the second restoration rate adjusted in step S30 is performed (step S32). That is, the first gain α and the second gain β adjusted by the restoration rate control unit 150 are applied to the multipliers 112 and 122, in which the first increment or decrement data output from the first point image restoration filter processing unit 110 is multiplied by the first gain α, and similarly, the second increment or decrement data output from the second point image restoration filter processing unit 120 is multiplied by the second gain β. The point image restoration process is performed by the adders 130 and 140 adding results of multiplication to the IR data.

Then, the amount of visible light in the twilight state is calculated using the amount of light C−(amount of light B−amount of light A), and it is discriminated whether the calculated amount of light is larger than zero (step S34). In a case where the calculated amount of light is larger than zero ("Yes"), the visible light is determined to be included, and the process proceeds to step S24 in which the processes of steps S24 to S34 (processing of the IR data at twilight) are repeatedly performed.

On the other hand, in a case where the calculated amount of light is equal to or smaller than zero ("No") in step S34, the visible light is determined not to be included and the process proceeds to step S36 in which the point image restoration process of the IR data captured at nighttime is performed. Since the visible light is not included, capturing of the near-infrared light image in the near-infrared light image capturing mode is capturing in which only the near-infrared light is used as a light source (step S36). The point image restoration process in only the second point image restoration filter is performed on the IR data captured using only the near-infrared light as the light source (step S38). That is, the point image restoration process in the second point image restoration filter processing unit 120, the multiplier 122 (the second gain β=1), and the adders 130 and

140 is performed, and the point image restoration process in the first point image restoration filter processing unit 110 or the like is not performed.

Subsequently, it is discriminated whether or not imaging at nighttime ends (step S40). In a case where the imaging does not end ("No"), the process proceeds to step S36 to repeat the process from step S36 to step S40. On the other hand, in a case where the imaging is ended ("Yes"), this imaging operation is ended.

In a state of dawn from nighttime to daytime without ending the imaging at nighttime, the visible light and the infrared light coexist, as in twilight. Accordingly, a point image restoration process of adjusting weights of the first gain α and the second gain β according to the light amount ratio between the amount of visible light and the amount of near-infrared light and performing weighted averaging of the point image restoration process using the first point image restoration filter and the point image restoration process using the second point image restoration filter is performed, as in the twilight state. Further, in a determination of the dawn state, in a case where the amount of light at nighttime is a constant amount of only the near-infrared light, but the constant amount of light has increased as illustrated in FIG. 8, the dawn state can be determined, and the increase can be determined to be the amount of light due to the visible light.

Further, in step S34, in a case where the amount of light (amount of visible light) calculated using the amount of light C−(amount of light B−amount of light A) becomes zero, the visible light is determined not to be included (that is, an image of only the near-infrared light component), but the present invention is not limited thereto and an image may be determined to be the image of only the near-infrared light component even in a case where the amount of visible light is very small. That is, the image of only the near-infrared light component is not limited to only an image in which the amount of visible light is zero, and includes an image in which a light amount ratio of visible light detected by the light amount ratio detection unit 160 is very low, such as 10% or less of a total amount, preferably, 5% or less and, more preferably, 3% or less. This is because, in the case of an image in which the light amount ratio of the visible light is very low, it is possible to more satisfactorily perform point image restoration through the point image restoration process using only the second point image restoration filter.

Figure 10:
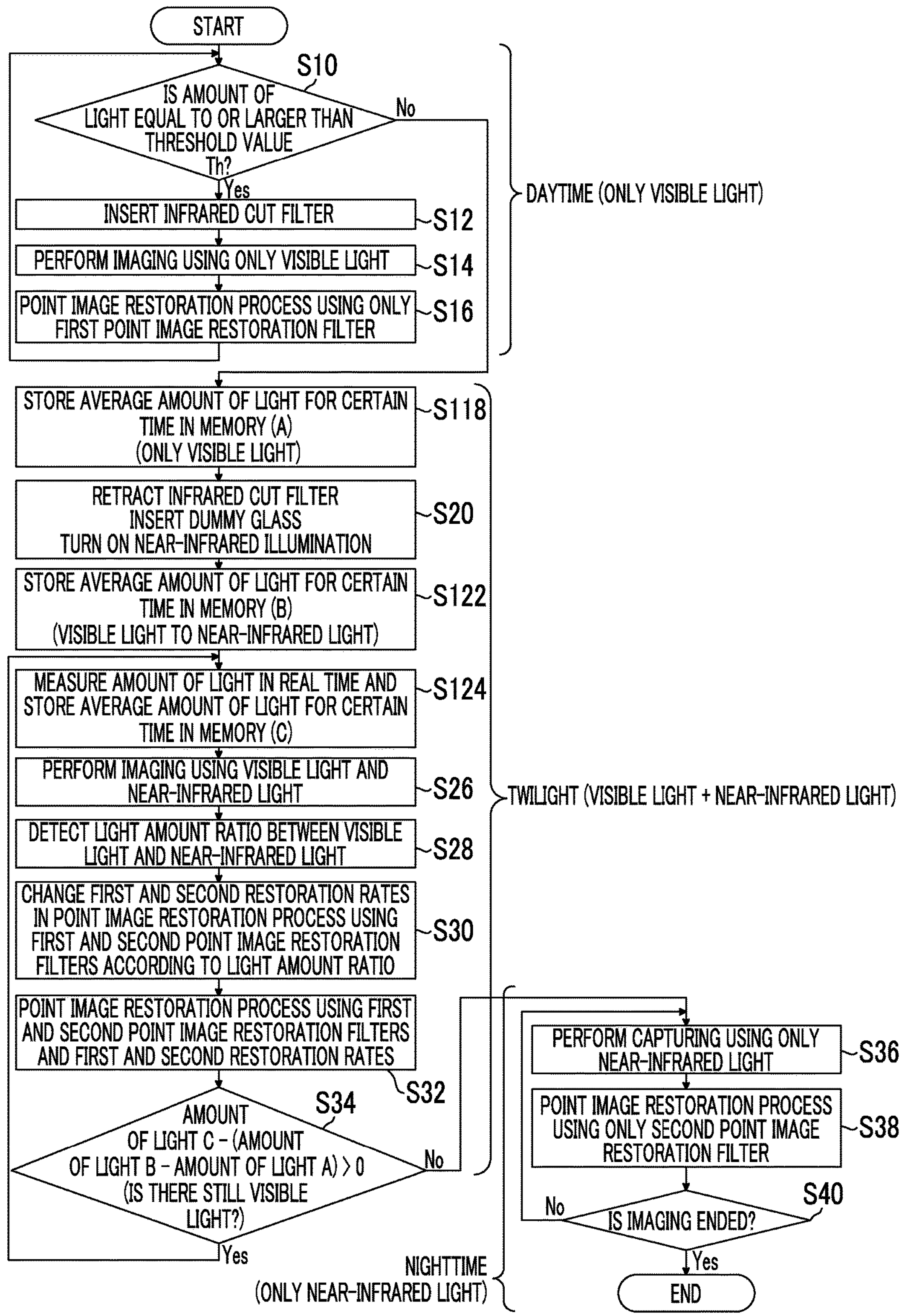
FIG. 10 is a flowchart illustrating a modification example of the first embodiment of the image processing method.

FIG. 10 is a flowchart illustrating a modification example of the first embodiment of the image processing method illustrated in FIG. 9. In FIG. 10, steps of performing the same process as that illustrated in FIG. 9 are denoted with the same step numbers, and detailed description thereof will be omitted.

The image processing method illustrated in FIG. 10 is different in that processes of steps S118, S122 and S124 are performed in place of the processes of steps S18, S22, and S24 illustrated in FIG. 9.

In step S118 illustrated in FIG. 10, the amount of light (for example, a representative amount of light such as an average amount of light or a median value) for a certain time (an imaging period of a plurality of frames of moving image data) is measured as the amount of light A when the amount of light of the subject is smaller than the threshold value Th. The measured amount of light is temporarily stored in a memory.

Similarly, in step S122, the amount of light of the subject is detected for a certain time immediately after the imaging mode is switched to the near-infrared light image capturing mode, and the amount of light for the certain time is stored as the amount of light B immediately after the imaging mode is switched to the near-infrared light image capturing mode in the memory.

In step S124, the amount of light is measured in real time, and the amount of light measured from a point in time before a certain time from a present point in time, to the present point in time is set as the amount of light C at the present point in time.

Each amount of light that is used to detect the light amount ratio between the amount of visible light and the amount of near-infrared light as described above is detected as the amount of light for a certain time, such that the light amount ratio can be detected accurately and stably.

The restoration rate control unit 150 illustrated in FIG. 7 determines the first gain α and the second gain β so that a sum (α+β) of the first gain α and the second gain β is 1, but the present invention is not limited thereto and the first gain α and the second gain β may be determined so that the sum becomes an arbitrary value γ (hereinafter referred to as a "total gain").

Figure 11:
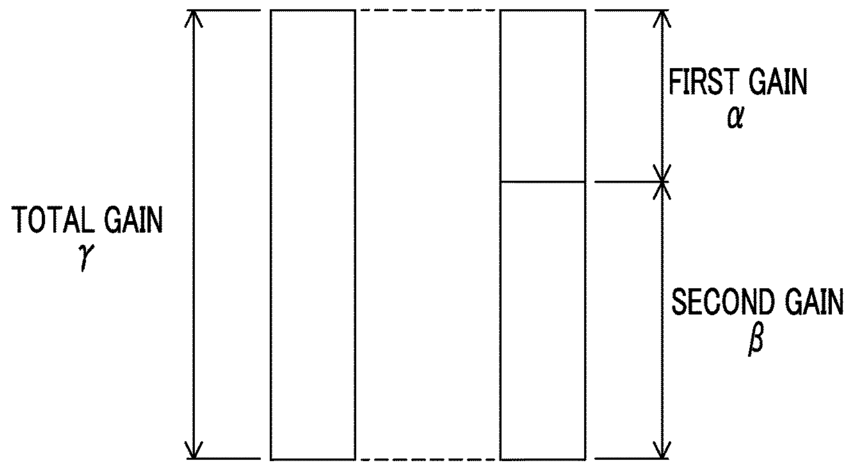
FIG. 11 is a conceptual diagram illustrating a relationship among a total gain γ, a first gain α, and a second gain β.

FIG. 11 is a conceptual diagram illustrating a relationship among the total gain γ, the first gain α, and the second gain β.

When the total gain γ is set and the light amount ratio is detected by the light amount ratio detection unit 160 (that is, the ratio between the first gain α and the second gain β is determined), the first gain α and the second gain β can be uniquely obtained.

Here, the total gain γ is a target restoration strength in the point image restoration process and may fluctuate depending on imaging setting conditions (optical characteristics), but can have a constant value when the imaging setting conditions are determined. Examples of the imaging setting conditions described herein include various imaging conditions and setting conditions such as a lens, an aperture, a zoom, a subject distance, sensitivity, and an imaging mode. Further, a user of the imaging device 10 can also set the total gain γ to an arbitrary fixed value.

When the total gain γ is increased, the restoration strength in the point image restoration process is increased, but this tends to be overcorrection in which artifacts are generated. On the other hand, when the total gain γ is decreased, adverse effects of overcorrection can be prevented, but there is a problem in that the restoration strength in the point image restoration process is decreased, sufficient point image restoration is not performed, and blurrness remains. Therefore, it is preferable for the total gain γ to be determined in consideration of advantages and disadvantages obtained by increasing or decreasing the restoration strength in the point image restoration process.

Second Embodiment of Point Image Restoration Processing Unit

Next, a second embodiment of the point image restoration processing unit 48 illustrated in FIG. 6 will be described.

Figure 12:
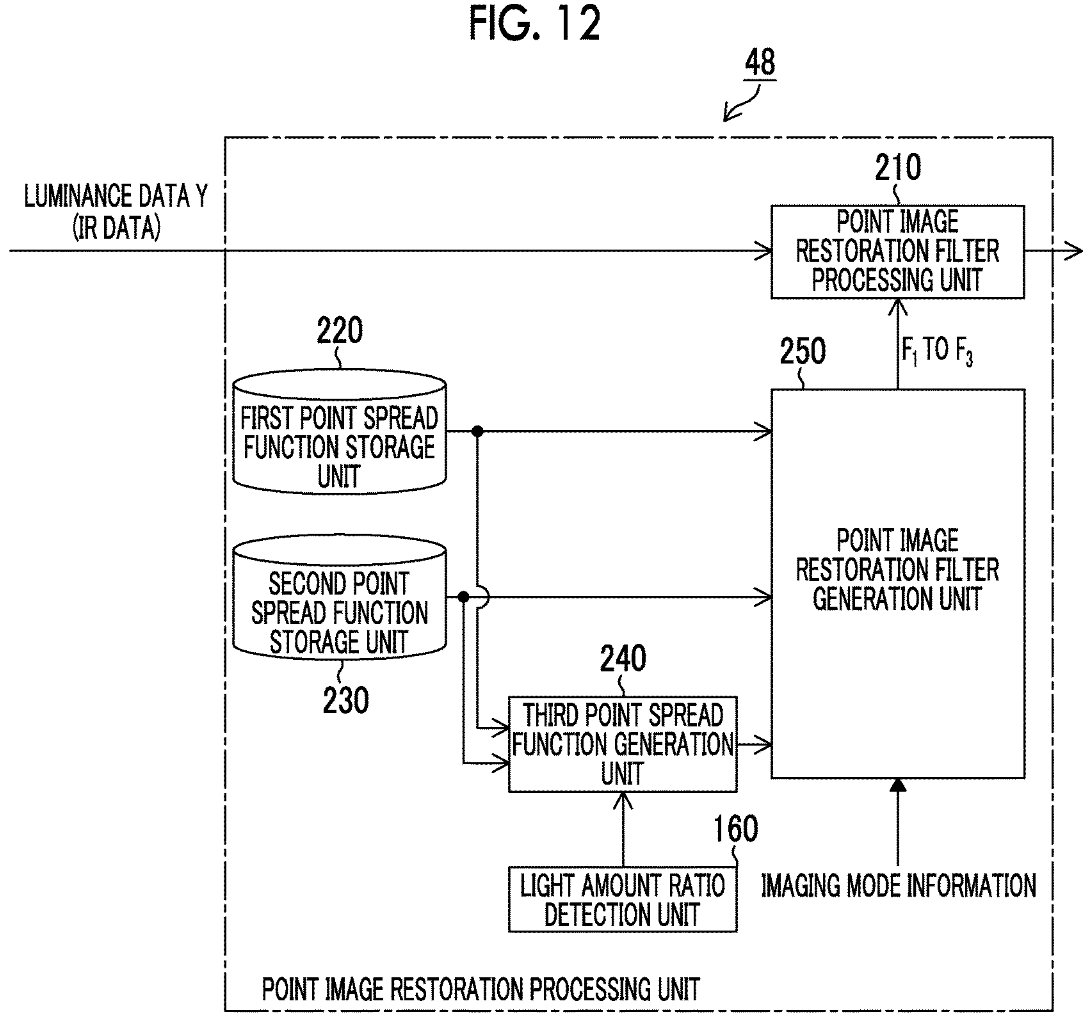
FIG. 12 is a block diagram illustrating a point image restoration processing unit according to a second embodiment.

FIG. 12 is a block diagram illustrating the point image restoration processing unit 48 of the second embodiment. The point image restoration processing unit 48 of the second embodiment mainly includes a point image restoration filter processing unit 210, a first point spread function storage unit 220, a second point spread function storage unit 230, a third point spread function generation unit 240, a point image restoration filter generation unit 250, and a light amount ratio detection unit 160.

The point image restoration filter processing unit 210 receives the luminance data Y or the IR data according to the imaging mode, and performs the point image restoration process using any one of the first point image restoration filter $F_1$, the second point image restoration filter $F_2$, and the third point image restoration filter $F_3$ generated by the point image restoration filter generation unit 250 on the input image data (the luminance data Y or the IR data) to calculate image data subjected to the point image restoration process. That is, the point image restoration filter processing unit 210 performs a deconvolution calculation of image data having a predetermined kernel size around a processing target pixel in the input image data (the same kernel size as that of the point image restoration filter such as 7×7 or 9×9) and any one of the first point image restoration filter $F_1$, the second point image restoration filter $F_2$, and the third point image restoration filter $F_3$ to calculate the image data subjected to the point image restoration process.

The first point spread function storage unit 220 is a storage unit that stores a first point spread function (first PSF) for the visible light of the optical system (the lens 16 or the like).

The second point spread function storage unit 230 is a storage unit that stores a second point spread function (second PSF) for the near-infrared light of the optical system (the lens 16 or the like).

The point images are captured in illumination conditions with a light source including only the visible light and a light source including only the near-infrared light, and the first PSF and the second PSF are measured on the basis of image data of point images obtained at the time of the imaging, respectively. The first PSF and the second PSF are measured prior to product shipment in advance and stored in the first point spread function storage unit 220 and the second point spread function storage unit 230.

The third point spread function generation unit 240 is a unit that generates a third PSF for twilight, and the third point spread function generation unit 240 calculates the third PSF obtained by performing weighted average of the first PSF and the second PSF according to the light amount ratio on the basis of the first PSF read from the first point spread function storage unit 220, the second PSF read from the second point spread function storage unit 230, and the light amount ratio applied from the light amount ratio detection unit 160. The light amount ratio detection unit 160 has the same function as that of the light amount ratio detection unit 160 illustrated in FIG. 7, and detects the light amount ratio between the amount of visible light and the amount of near-infrared light in the twilight state.

Here, when the light amount ratio between the amount of visible light of the amount of near-infrared light in the twilight state is p:q, p+q=1, the third point spread function generation unit 240 calculates the third PSF for twilight using the following equation.

$$\text{third PSF}=\text{first PSF}\times p+\text{second PSF}\times q \quad \text{[General Formula 2]}$$

The point image restoration filter generation unit 250 acquires the first PSF, the second PSF, or the third PSF from the first point spread function storage unit 220, the second point spread function storage unit 230, or the third point spread function generation unit 240, and generates any one of the first point image restoration filter $F_1$, the second point image restoration filter $F_2$, and the third point image restoration filter $F_3$ on the basis of the acquired PSF.

Generally, a convolution type of Wiener filter can be used to restore the bokeh image using the PSF. Frequency characteristics $d(\omega_x, \omega_y)$ of the point image restoration filter can be calculated using the following formula by referring to information on an optical transfer function (OTF) obtained by performing Fourier transform on PSF (x, y) and a signal-to-noise ratio (SNR).

$$d(\omega_x, \omega_y) = \frac{H^*(\omega_x, \omega_y)}{\|H(\omega_x, \omega_y)\|^2 + 1/SNR(\omega_x, \omega_y)} \quad \text{[General Formula 3]}$$

Here, $H(\omega_x, \omega_y)$ represents OTF, and $H^*(\omega_x, \omega_y)$ represents a complex conjugate thereof. Further, $SNR(\omega_x, \omega_y)$ represents a signal-to-noise ratio.

A design of filter coefficients of the point image restoration filter is an optimization issue of selecting coefficient values such that frequency characteristics of the filter are closest to desired Wiener frequency characteristics, and the filter coefficients are appropriately calculated using an arbitrary known scheme.

The point image restoration filter may be calculated using a modulation transfer function (MTF) representing an amplitude component of the OTF in place of the OTF of General Formula (3) above.

Imaging mode information is applied from the camera controller 28 to the point image restoration filter generation unit 250. In a case where the imaging mode information indicates the visible light image capturing mode, the point image restoration filter generation unit 250 reads the first PSF from the first point spread function storage unit 220 and generates the first point image restoration filter $F_1$ on the basis of the read first PSF.

Similarly, in a case where the imaging mode information indicates the near-infrared light image capturing mode, the point image restoration filter generation unit 250 further discriminates whether a time zone is nighttime or twilight (dawn). The point image restoration filter generation unit 250 reads the second PSF from the second point spread function storage unit 230 and generates the second point image restoration filter $F_2$ on the basis of the read second PSF in a case of the nighttime, and acquires the third PSF generated by the third point spread function generation unit 240 and generates the third point image restoration filter $F_3$ on the basis of the acquired third PSF in the case of the twilight (dawn). The discrimination as to whether the time zone is nighttime or twilight (dawn) can be performed on the basis of a detection output of the light amount ratio detection unit 160 or the amount of light of the subject that is measured by the camera controller 28.

In the case of the visible light image capturing mode, the luminance data Y is input to the point image restoration filter processing unit 210, and the first point image restoration filter $F_1$ is also input from the point image restoration filter generation unit 250 to the point image restoration filter processing unit 210. The point image restoration filter processing unit 210 performs deconvolution calculation of the luminance data Y and the first point image restoration filter $F_1$ to calculate the luminance data Y subjected to the point image restoration process.

In the case of the near-infrared light image capturing mode, the IR data is input to the point image restoration filter processing unit 210, and the second point image restoration filter $F_2$ or the third point image restoration filter $F_3$ is also input from the point image restoration filter generation unit 250 to the point image restoration filter processing unit 210 according to whether the time zone is nighttime or twilight (dawn). The point image restoration filter processing unit 210 performs deconvolution calculation of the IR data and the second point image restoration filter $F_2$ or deconvolution calculation of the IR data and the third point image restoration filter $F_3$ to calculate the IR data subjected to the point image restoration process.

Since the PSF is changed according to imaging conditions such as the aperture value (an F-number), a zoom magnification, a subject distance, and an angle of view (an image height), it is preferable for the first point spread function storage unit 220 and the second point spread function storage unit 230 to store a plurality of first PSFs and second PSFs according to the imaging conditions, and it is preferable for the third point spread function generation unit 240 and the point image restoration filter generation unit 250 to read the first PSF and the second PSF according to the imaging conditions from the first point spread function storage unit 220 and the second point spread function storage unit 230, respectively.

Second Embodiment of Image Processing Method

Figure 13:
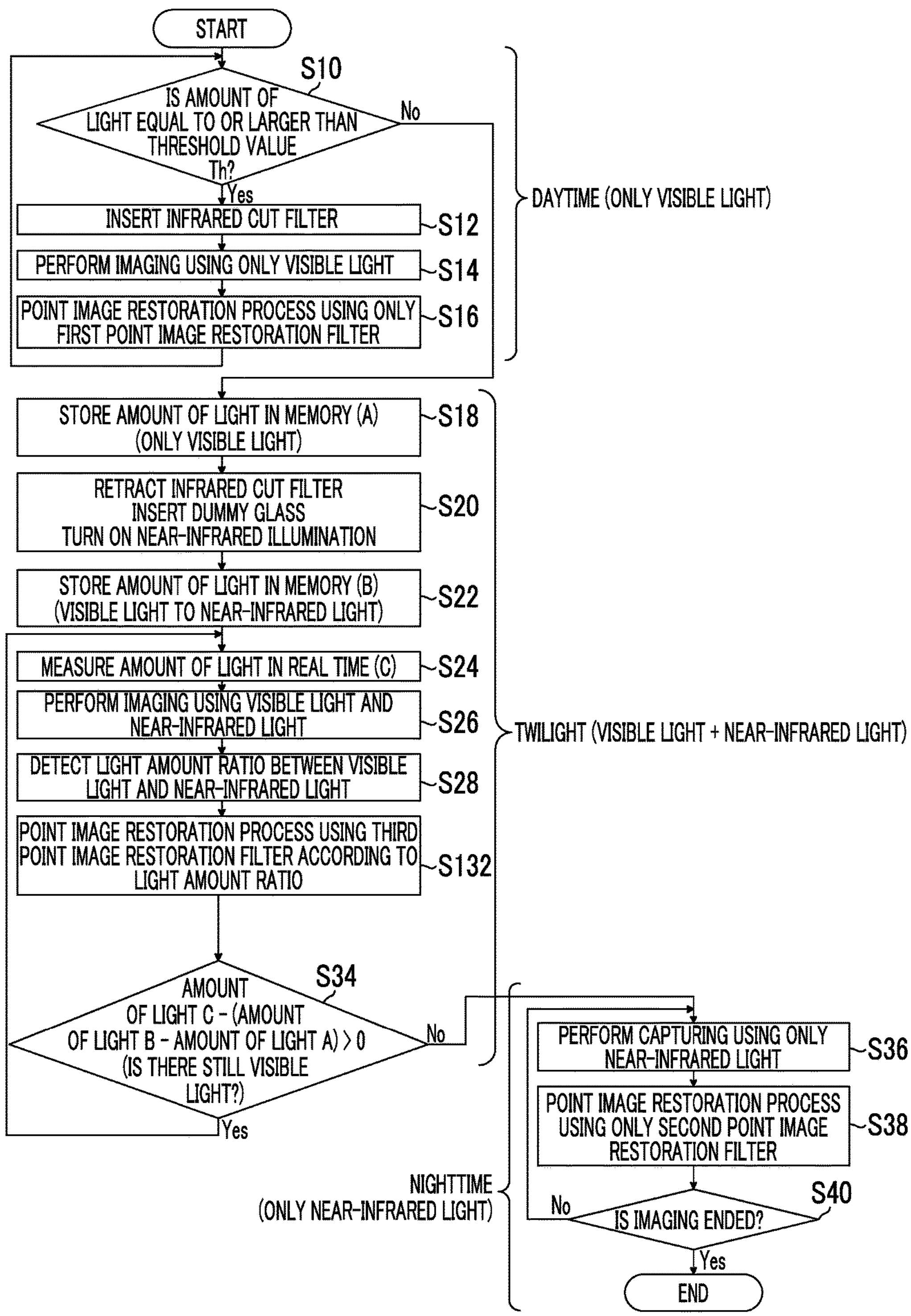
FIG. 13 is a flowchart illustrating a second embodiment of the image processing method.

FIG. 13 is a flowchart illustrating a second embodiment of the image processing method according to the present invention, and illustrates a point image restoration processing operation in the point image restoration processing unit 48 of the second embodiment illustrated in FIG. 12. In FIG. 13, steps of performing the same process as that illustrated in FIG. 9 are denoted with the same step numbers, and detailed description thereof will be omitted.

The image processing method illustrated in FIG. 13 is different in that a process of step S132 is performed in place of the processes of steps S30 and S32 illustrated in FIG. 9.

In step S132 illustrated in FIG. 13, the first PSF for visible light and the second PSF for near-infrared light are subjected to weighted averaging on the basis of the light amount ratio between the amount of visible light and the amount of near-infrared light detected by the light amount ratio detection unit 160 with respect to the IR data of the twilight to generate the third PSF for twilight, and the third point image restoration filter is generated on the basis of the third generated PSF. The point image restoration process is performed on the IR data acquired at the time of twilight using the third generated point image restoration filter.

Third Embodiment of Point Image Restoration Processing Unit

Next, a third embodiment of the point image restoration processing unit 48 illustrated in FIG. 6 will be described.

Figure 14:
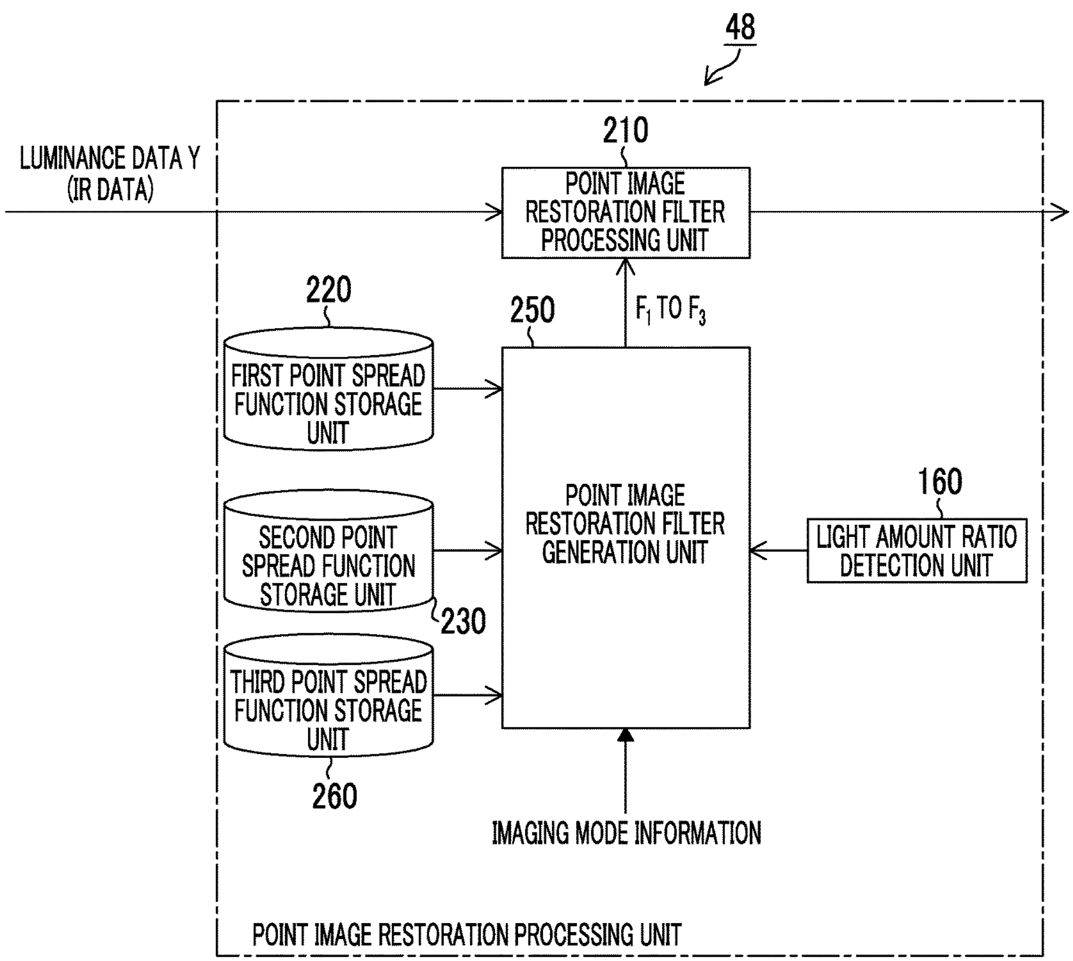
FIG. 14 is a block diagram illustrating a point image restoration processing unit according to a third embodiment.

FIG. 14 is a block diagram illustrating a point image restoration processing unit 48 of the third embodiment. The same portions as those in the second embodiment illustrated in FIG. 12 are denoted with the same reference numerals, and detailed description thereof will be omitted.

The point image restoration processing unit 48 of the third embodiment illustrated in FIG. 14 is mainly different in that a third point spread function storage unit 260 is included in place of the third point spread function generation unit 240 illustrated in FIG. 12.

That is, the third PSF generated similarly to the third PSF that is generated by the third point spread function generation unit 240 illustrated in FIG. 12 is stored in the third point spread function storage unit 260 in association with the light amount ratio of the amount of visible light and the amount of near-infrared light in advance.

The point image restoration filter generation unit 250 acquires the first PSF, the second PSF, or the third PSF from the first point spread function storage unit 220, the second point spread function storage unit 230, or the third point spread function storage unit 260, and generates any one of the first point image restoration filter $F_1$, the second point image restoration filter $F_2$, and the third point image restoration filter $F_3$ on the basis of the acquired PSF.

The imaging mode information from the camera controller 28 and the detection output indicating the light amount ratio from the light amount ratio detection unit 160 are applied to the point image restoration filter generation unit 250. In a case where the imaging mode information indicates the visible light image capturing mode, the point image restoration filter generation unit 250 reads the first PSF from the first point spread function storage unit 220 and generates the first point image restoration filter $F_1$ on the basis of the read first PSF.

Similarly, in a case where the imaging mode information indicates the near-infrared light image capturing mode, the point image restoration filter generation unit 250 discriminates whether the time zone is nighttime or twilight (dawn) on the basis of the detection output that is applied from the light amount ratio detection unit 160. In the case of the nighttime, the point image restoration filter generation unit 250 reads the second PSF from the second point spread function storage unit 230 and generates the second point image restoration filter $F_2$ on the basis of the read second PSF. In the case of the twilight (dawn), the point image restoration filter generation unit 250 reads the third PSF according to the light amount ratio from the third point spread function storage unit 260 and generates the third point image restoration filter $F_3$ on the basis of the read third PSF.

Fourth Embodiment of Point Image Restoration Processing Unit

Next, a fourth embodiment of the point image restoration processing unit 48 illustrated in FIG. 6 will be described.

Figure 15:
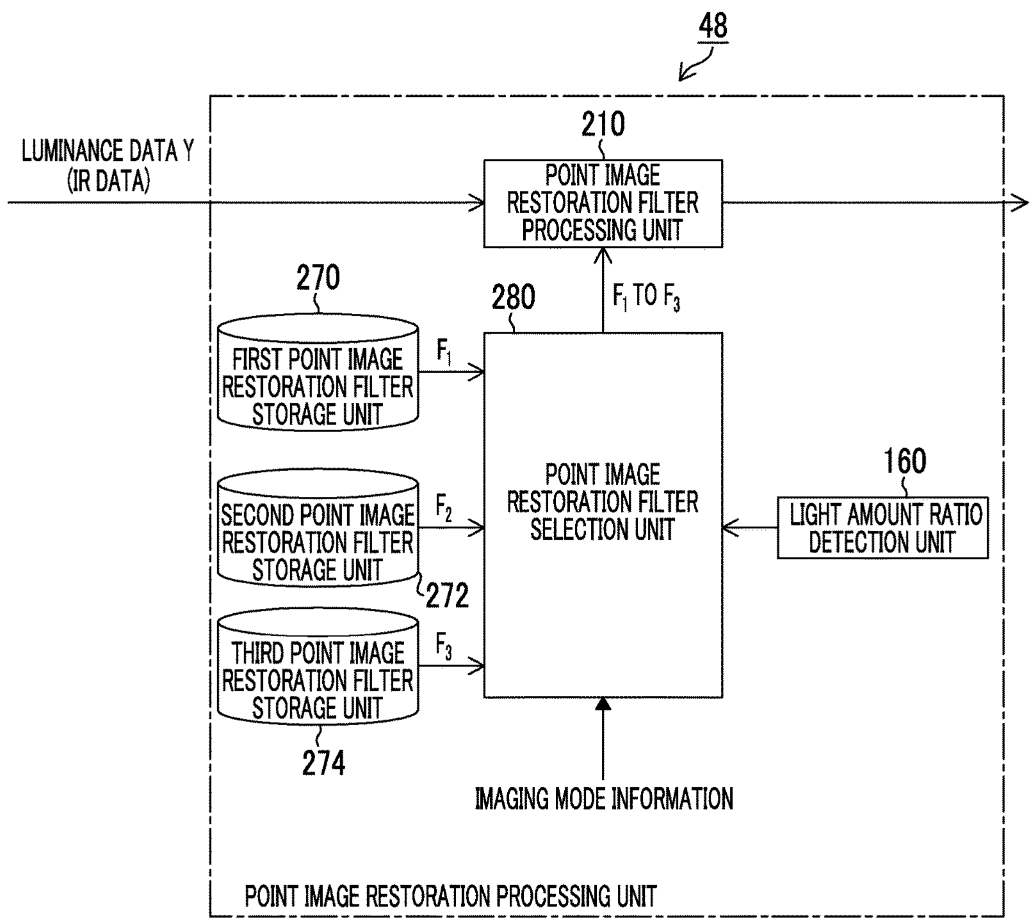
FIG. 15 is a block diagram illustrating a point image restoration processing unit according to a fourth embodiment.

FIG. 15 is a block diagram illustrating a point image restoration processing unit 48 of the fourth embodiment. The same portions as those in the third embodiment illustrated in FIG. 14 are denoted with the same reference numerals, and detailed description thereof will be omitted.

The point image restoration processing unit 48 of the fourth embodiment illustrated in FIG. 15 is mainly different in that the point image restoration processing unit 48 includes a first point image restoration filter storage unit 270, a second point image restoration filter storage unit 272, and a third point image restoration filter storage unit 274 in place of the first point spread function storage unit 220, the second point spread function storage unit 230, and the third point spread function storage unit 260 illustrated in FIG. 14, and includes a point image restoration filter selection unit 280 in place of the point image restoration filter generation unit 250.

That is, in the fourth embodiment, the first point image restoration filter $F_1$, the second point image restoration filter $F_2$, and the third point image restoration filter $F_3$ are generated on the basis of the first PSF, the second PSF, and the third PSF in advance. The first point image restoration filter $F_1$, the second point image restoration filter $F_2$, and the third point image restoration filter $F_3$ that have been generated are stored in the first point image restoration filter storage unit 270, the second point image restoration filter storage unit 272, and the third point image restoration filter storage unit 274, respectively.

The imaging mode information from the camera controller 28 and the detection output indicating the light amount ratio from the light amount ratio detection unit 160 are applied to the point image restoration filter selection unit 280. In a case where the imaging mode information indicates the visible light image capturing mode, the point image restoration filter selection unit 280 selects the first point image restoration filter $F_1$ stored in the first point image restoration filter storage unit 270, and outputs the selected first point image restoration filter $F_1$ to the point image restoration filter processing unit 210.

Similarly, in a case where the imaging mode information indicates the near-infrared light image capturing mode, the point image restoration filter selection unit 280 further discriminates whether the time zone is nighttime or twilight (dawn). In the case of the nighttime, the point image restoration filter selection unit 280 selects the second point image restoration filter $F_2$ stored in the second point image restoration filter storage unit 272, and outputs the selected second point image restoration filter $F_2$ to the point image restoration filter processing unit 210. In the case of the twilight (dawn), the point image restoration filter selection unit 280 selects the third point image restoration filter $F_3$ stored in the third point image restoration filter storage unit 274, which is the third point image restoration filter $F_3$ according to the light amount ratio detected by the light amount ratio detection unit 160, and outputs the selected third point image restoration filter $F_3$ to the point image restoration filter processing unit 210.

<Image Processing Device of Second Embodiment>

Figure 16:
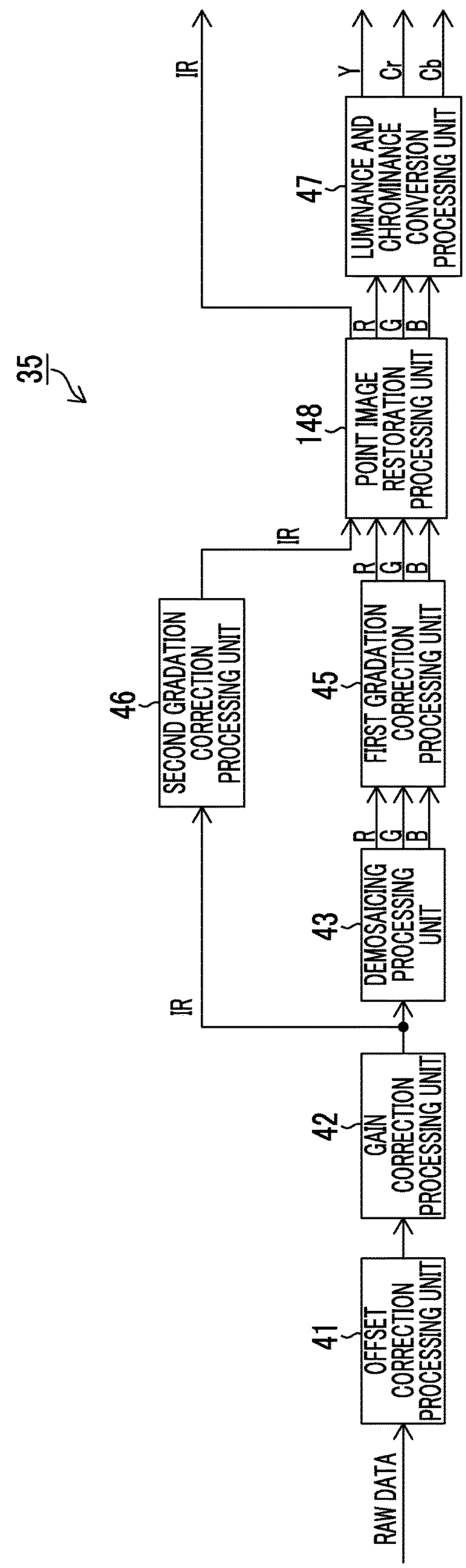
FIG. 16 is a block diagram illustrating a second embodiment of an image processing unit in a camera controller.

FIG. 16 is a block diagram illustrating a second embodiment of the image processing unit 35 in the camera controller 28 illustrated in FIG. 5. The same portions as those in the first embodiment illustrated in FIG. 6 are denoted with the same reference numerals, and detailed description thereof will be omitted.

The image processing unit 35 of the second embodiment illustrated in FIG. 16 is different in that the image processing unit 35 of the first embodiment performs the point image restoration process on the luminance data Y of the visible light image, whereas the image processing unit 35 performs the point image restoration process using the first point image restoration filter corresponding to each of pieces of the RGB data on the first color data (G data) representing the visible light image, and second color data (R data and B data) of two or more colors having a contribution rate for obtaining the luminance data lower than that of the first color data (G data).

That is, the RGB data of three surfaces of RGB subjected to gradation correction is applied from the first gradation correction processing unit 45 to the point image restoration processing unit 148 illustrated in FIG. 16 in the visible light image capturing mode, and the IR data subjected to gradation correction is applied from the second gradation correction processing unit 46 to the point image restoration processing unit 148 in the near-infrared light image capturing mode.

The point image restoration processing unit 148 performs the point image restoration process on each of pieces of RGB data using a first point image restoration filter $F_{1R}$ based on the first point spread function for the visible light (R light) of the optical system (the lens 16 or the like), a first point image restoration filter $F_{1G}$ based on the first point spread function for G light of the optical system, and a first point image restoration filter $F_{1B}$ based on the first point spread function for B light of the optical system.

Further, the point image restoration processing unit 148 performs, on the IR data, the same point image restoration process as the point image restoration process that the point image restoration processing unit 48 of the first embodiment illustrated in FIG. 6 performs on the IR data.

According to the point image restoration processing unit 148 of the second embodiment, since the point image restoration process is performed on the RGB data indicating the visible light image using the first point image restoration filters $F_{1R}$, $F_{1G}$ and $F_{1B}$ corresponding to the respective colors, it is possible to perform a more accurate point image restoration process and to perform correction of lateral chromatic aberration.

Another Embodiment of Imaging Element

Figure 17A:
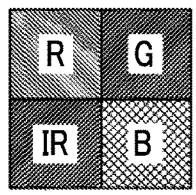
FIGS. 17A and 17B are a diagram illustrating a basic arrangement pattern of color filters for RGB and a near-infrared light transmission filter provided in an imaging element of another embodiment, and a graph illustrating spectral transmittance characteristics of the respective color filters for RGB and the near-infrared light transmission filter.

FIG. 17A is a diagram illustrating another embodiment of an imaging element that is applicable to the imaging device according to the present invention, and particularly illustrates a basic array pattern of color filters for RGB and a near-infrared light transmission filter provided in the imaging element. Further, FIG. 17B illustrates spectral transmittance characteristics of respective color filters for RGB and the near-infrared light transmission filter.

Figure 17B:
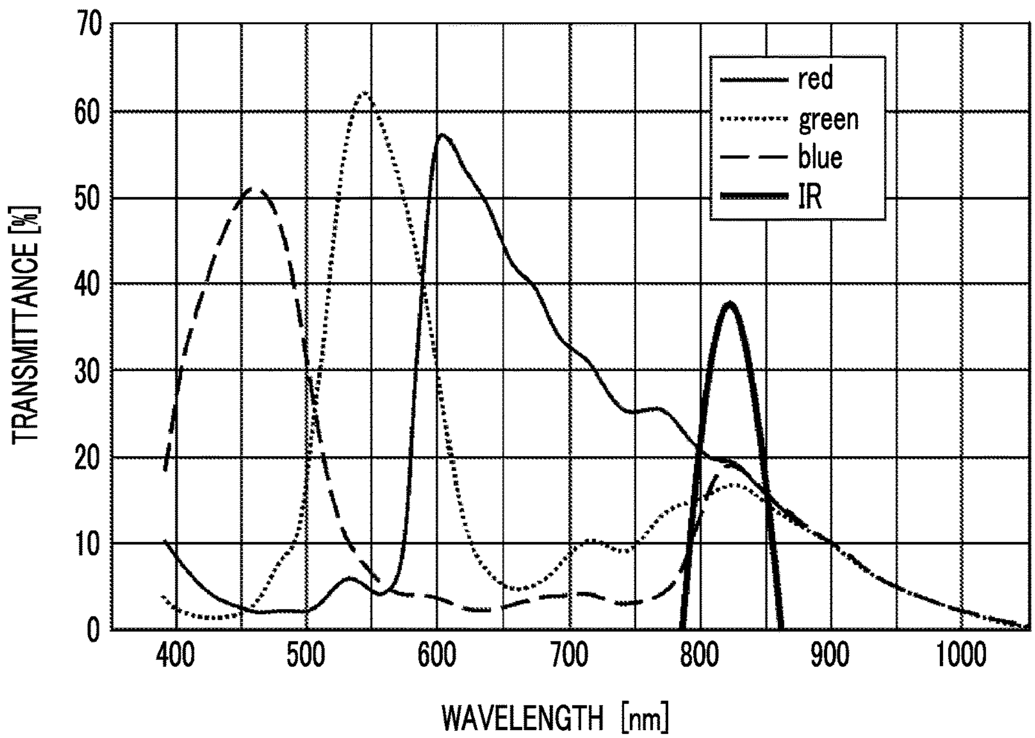

The R pixel, the G pixel, and the B pixel having respective color filters for RGB of the imaging element having the basic array pattern illustrated in FIG. 17A have substantially the same sensitivity to the near-infrared light (see FIG. 3) of the near-infrared LED, and the pixel having a near-infrared light transmission filter (hereinafter, referred to as an "IR pixel") has sensitivity to only the near-infrared light wavelength region (FIG. 17B).

In the visible light image capturing mode, in a case where the infrared cut filter 20 is inserted, only light in respective wavelength bands of R, and B is incident on the R pixel, the G pixel, and the B pixel, and light is hardly incident on the IR pixel. Therefore, the RGB data can be acquired from the R pixel, the G pixel, and the B pixel.

In the near-infrared light image capturing mode, in a case where the infrared cut filter 20 is retracted, light in the respective wavelength bands and the near-infrared light wavelength band of R, and B is incident on the R pixel, the G pixel, and the B pixel, and only light in the near-infrared light wavelength band is incident on the IR pixel. In this case, the R pixel, the G pixel, and the B pixel can function as IR pixels, respectively.

Thus, in the near-infrared light image capturing mode, the IR data (first IR data) can be acquired from the R pixel, the G pixel, and the B pixel functioning as the IR pixels, and the IR data (second IR data) can be acquired from the IR pixel.

The first IR data has a higher resolution than that of the second IR data, but the visible light component coexists in the twilight state. The second IR data has a lower resolution than the first IR data, but the visible light component does not coexist in the twilight state. Since the IR data at a position of the IR pixel is missing in the first IR data, it is necessary to obtain the IR data at the position of the IR pixel through interpolation calculation.

Further, since the visible light component and the near-infrared light component are included in the first IR data captured in the twilight state, it is preferable to perform a point image restoration process obtained by performing weighted averaging on the point image restoration process in the first point image restoration filter and the point image restoration process in the second point image restoration filter according to the light amount ratio between the amount of visible light and the amount of near-infrared light as described above. In this case, when the light amount ratio between the amount of visible light and the amount of near-infrared light is calculated, the first IR data can be used for calculation of the amount of near-infrared light.

Further, as an imaging element of still another embodiment, an imaging element in which first pixels for capturing of a visible light image having sensitivity to only the respective wavelength bands of R, and B (pixels having color filters for RGB+an infrared cut filter) are used as the R pixel, the G pixel, and the B pixel illustrated in FIG. 17A, and a second pixel (IR pixel) for capturing of the near-infrared light image having sensitivity to the visible light wavelength band and the near-infrared light wavelength band is used in place of the IR pixel having a near-infrared light transmission filter is conceivable.

In this case, a mechanism that loads and unloads the infrared cut filter is not necessary, and it is also possible to simultaneously capture the visible light image and the near-infrared light image.

<Example of Application to EDoF System>

The point image restoration process in the above-described embodiment is image processing for restoring point spread (point image bokeh) according to specific imaging conditions (for example, an aperture value, an F-number, a focal length, or image height) to an original subject image, but image processing to which the present invention is applicable is not limited to the point image restoration process in the above-described embodiment. For example, the point image restoration process according to the present invention is also applicable to a point image restoration process for image data captured and acquired by an optical system (lens or the like) having an extended depth of field (EDoF)(focus).

By performing the point image restoration process on the image data of the bokeh image that is captured and acquired in a state in which the depth of field (a focal depth) is extended by the EDoF optical system, it is possible to restore the image data to high-resolution image data in a state in which a subject is focused in a wide range. In this case, a restoration process using a point image restoration filter based on a transfer function (such as a PSF, an OTF, an MTF, or a phase transfer function (PTF)) of the EDoF optical system, which is a point image restoration filter having a filter coefficient set such that good image restoration can be achieved in a range of the extended depth of field (focal depth) is performed.

Figure 18:
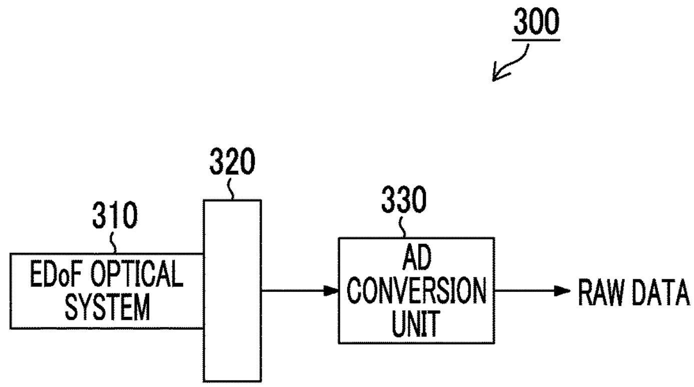
FIG. 18 is a block diagram illustrating an aspect of an imaging module including an EDoF optical system.

FIG. 18 is a block diagram illustrating an aspect of an imaging module 300 including an EDoF optical system. An imaging module (a camera head mounted on the imaging device 10) 300 of this example includes an EDoF optical system (lens unit) 310, an imaging element 320, and an AD conversion unit 330.

Figure 19:
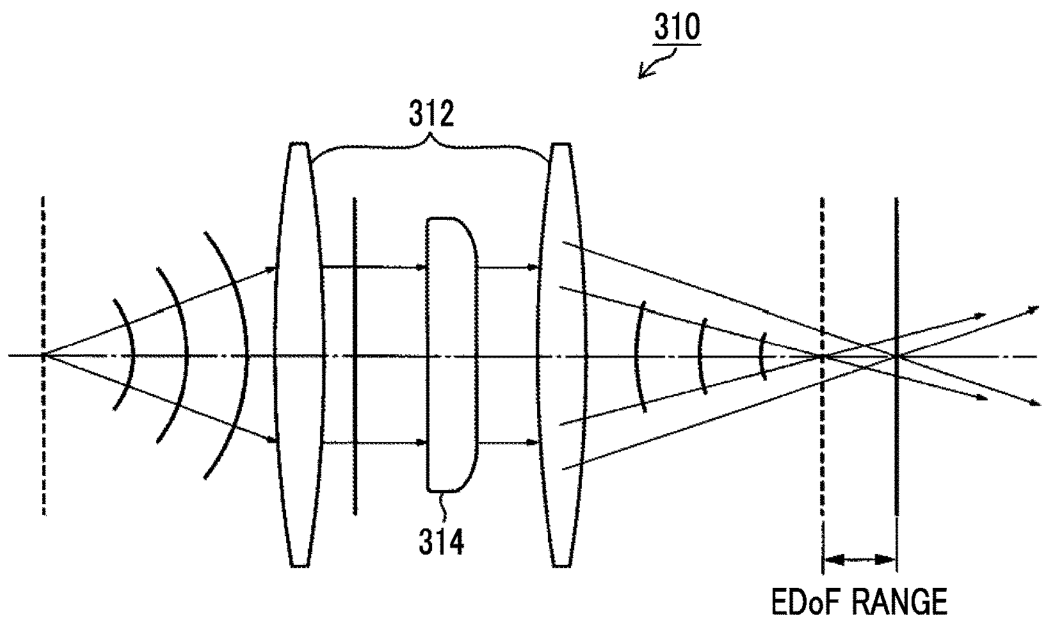
FIG. 19 is a diagram illustrating an example of an EDoF optical system.

FIG. 19 is a diagram illustrating an example of the EDoF optical system 310. The EDoF optical system 310 of this example includes a fixed lens 312 with a single focus, and an optical filter 314 disposed at a pupil position. The optical filter 314 modulates a phase and changes the EDoF optical system 310 (the lens 312) to have EDoF such that the extended depth of field (focal depth) (EDoF) can be obtained. Thus, the lens 312 and the optical filter 314 constitute a lens unit that modulates the phase to extend the depth of field.

The EDoF optical system 310 includes other components, as necessary. For example, an aperture (not illustrated) is disposed near the optical filter 314. Further, the optical filter 314 may be one filter or may be a combination of a plurality of filters. Further, the optical filter 314 is only one example of optical phase modulation means, and the EDoF of the EDoF optical system 310 (the lens 312) may be realized by other means. For example, the EDoF of the EDoF optical system 310 may be realized by a lens 312 designed to have the same function as the optical filter 314 of this embodiment, in place of the optical filter 314.

That is, the EDoF of the EDoF optical system 310 can be realized by a variety of means that change a wavefront of an image formed on a light reception surface of the imaging element 320. For example, "an optical element of which the thickness is changed", "an optical element of which the refractive index is changed (such as a refraction index distribution type wavefront modulation lens)", "an optical element of which the thickness or the refractive index is changed due to coding or the like on a lens surface (such as a wavefront modulation hybrid lens or an optical element formed as a phase surface on a lens surface), or "a liquid crystal element capable of modulating a phase distribution of light (such as a liquid crystal spatial phase modulation element)" can be adopted as EDoF means of the EDoF optical system 310. Thus, the present invention is applicable to not only a case where image formation regularly dispersed by an optical wavefront modulation element (the optical filter 314 (phase plate)) can be performed, but also a case where a dispersed image as in a case where an optical wavefront modulation element is used can be formed by the lens 312 itself without using the optical wavefront modulation element.

The EDoF optical system 310 illustrated in FIGS. 18 and 19 can be miniaturized since a focus adjustment mechanism that mechanically performs focus adjustment can be omitted. A mechanism (not illustrated) that loads and unloads the infrared cut filter is provided in the optical path of the EDoF optical system 310 or between the EDoF optical system 310 and the imaging element 320, similar to the imaging device 10 illustrated in FIG. 1.

The optical image passed through the EDoF optical system 310 having the EDoF is formed on the imaging element 320 illustrated in FIG. 18 and is converted into an electric signal in the imaging element 320.

As the imaging element 320, the same imaging element as the imaging element 26 illustrated in FIG. 1 can be applied.

The AD (Analog-to-Digital) conversion unit 330 converts an analog RGB signal output for each pixel from the imaging element 320 into a digital RGB signal. The digital image signal converted by the AD conversion unit 330 is output as RAW data.

By applying the image processing unit (image processing device) 35 illustrated in FIGS. 6 and 16 to the RAW data that is output from the imaging module 300, it is possible to generate image data indicating the visible light image and the near-infrared light image with a high resolution in a state in which a subject is focused is in a wide range.

Figure 20:
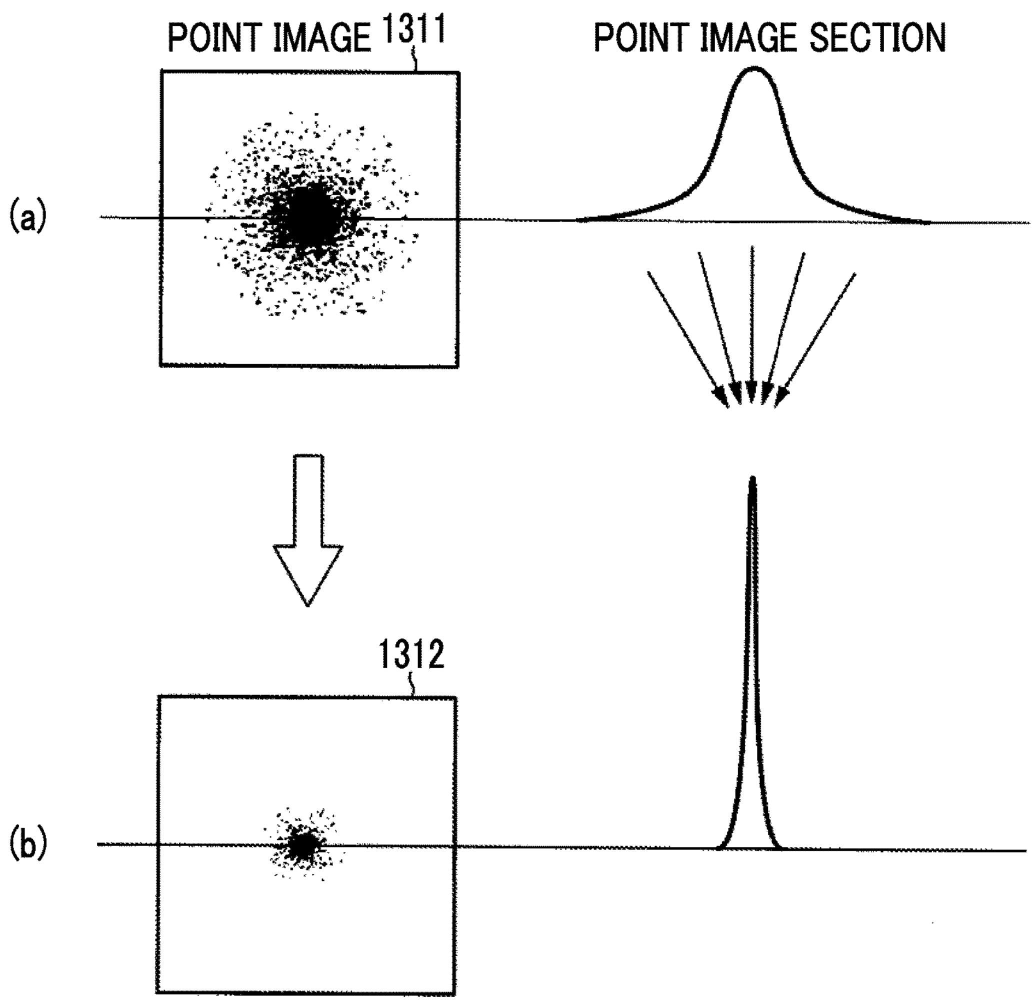
FIG. 20 is a diagram illustrating a restoration example of an image acquired via an EDoF optical system.

That is, a point image (an optical image) after passing through the EDoF optical system 310 is formed as a large point image (a bokeh image) on the imaging element 320 as indicated by reference numeral 1311 in FIG. 20, but is restored to a small point image (a high-resolution image), as illustrated by reference numeral 1312 in FIG. 20, through the point image restoration process in the point image restoration processing unit 48 or the point image restoration processing unit 148 of the image processing unit (image processing device) 35.

[Others]

Although the aspect in which the image processing unit (the image processing device) 35 is provided in the imaging device 10 (the camera controller 28) has been described in each of the above-described embodiments, the image processing unit (the image processing device) 35 may be provided in another device such as the computer 60 or the server 80.

For example, when the image data is processed in the computer 60, the point image restoration process of the image data may be performed by the image processing unit (image processing device) 35 provided in the computer 60. Further, in a case where the server 80 includes the image processing unit (image processing device) 35, for example, the image data may be transmitted from the imaging device 10 or the computer 60 to the server 80, the point image restoration process may be performed on the image data in the image processing unit (image processing device) 35 of the server 80, and the image data after the point image restoration process may be transmitted or provided to a transmission source.

Further, the aspect to which the present invention is applicable is not limited to the imaging device 10, the computer 60, and the server 80, and is also applicable to mobile devices having functions (a calling function, a communication function, and other computer functions) other than imaging in addition to the imaging function, in addition to a camera having imaging as a main function. Other aspects to which the present invention is applicable may include, for example, a mobile phone or a smart phone, a personal digital assistants (PDA), and a portable game machine having a camera function.

Further, each of the functional configurations described above can be appropriately realized by arbitrary hardware, arbitrary software, or a combination of both. For example, the present invention is applicable to an image processing program that causes a computer to execute the image processing method (an image processing procedure) in each device and the processing units (the camera controller 28, the device control unit 34, and the image processing unit 35) described above, a computer-readable recording medium (a non-transitory tangible recording medium) having the image processing program recorded thereon, or a computer in which the image processing program can be installed.

EXPLANATION OF REFERENCES

10: imaging device
12: lens unit (optical system)
15: near-infrared light emitting unit
16, 312: lens
18: optical system operation unit
20: infrared cut filter
22: dummy glass
24: filter device
26, 320: imaging element
28: camera controller
32: input and output interface
34: device control unit
35: image processing unit
41: offset correction processing unit
42: gain correction processing unit
43: demosaicing processing unit
45: first gradation correction processing unit
46: second gradation correction processing unit
47: luminance and chrominance conversion processing unit
48, 100, 148: point image restoration processing unit
110: first point image restoration filter processing unit
112, 122: multiplier
120: second point image restoration filter processing unit
130, 140: adder
150: restoration rate control unit
160: light amount ratio detection unit
210: point image restoration filter processing unit
220: first point spread function storage unit
230: second point spread function storage unit
240: third point spread function generation unit
250: point image restoration filter generation unit
260: third point spread function storage unit
270: first point image restoration filter storage unit
272: second point image restoration filter storage unit
274: third point image restoration filter storage unit
280: point image restoration filter selection unit
300: imaging module
310: EDoF optical system
314: optical filter

What is claimed is:

1. An image processing device, comprising:
an image acquisition unit that acquires image data including a near-infrared light image captured with sensitivity to a visible light wavelength band and a near-infrared light wavelength band using an optical system;
a point image restoration processing unit that performs a point image restoration process on the acquired image data using a first point image restoration filter based on a first point spread function for visible light of the optical system and a second point image restoration filter based on a second point spread function for near-infrared light of the optical system; and
a restoration rate control unit that controls the point image restoration processing unit to adjust a first restoration rate in the point image restoration process using the first point image restoration filter and a second restoration rate in the point image restoration process using the second point image restoration filter for the acquired image data, wherein:
the restoration rate control unit includes a light amount ratio detection unit that detects a light amount ratio between a first light amount by visible light and a second light amount by near-infrared light at the time of capturing the near-infrared light image; and
the restoration rate control unit adjusts the first restoration rate and the second restoration rate according to the detected light amount ratio.

2. The image processing device according to claim 1, wherein:
the point image restoration processing unit applies the first point image restoration filter and the second point image restoration filter to the acquired image data to generate first increment or decrement data and second increment or decrement data, and adds the first increment or decrement data and the second increment or decrement data that have been generated to the image data; and
the restoration rate control unit adjusts a first gain for the first increment or decrement data and a second gain for the second increment or decrement data according to the light amount ratio detected by the light amount ratio detection unit to adjust the first restoration rate and the second restoration rate.

3. The image processing device according to claim 2, wherein the restoration rate control unit acquires a total gain based on the first gain and the second gain, and adjusts a ratio between the first gain and the second gain in the acquired total gain according to the light amount ratio detected by the light amount ratio detection unit.

4. The image processing device according to claim 1, wherein:

the image data acquired by the image acquisition unit is continuously captured moving image data; and the light amount ratio detection unit measures the amount of light in an imaging period of a plurality of frames of the moving image data, and detects the light amount ratio between the first amount of light and the second amount of light on the basis of the measured amount of light.

5. The image processing device according to claim 1, wherein:

the image acquisition unit further acquires image data indicating a visible light image captured with sensitivity to a visible light wavelength band using the optical system; and the point image restoration processing unit performs the point image restoration process on the image data indicating the visible light image using the first point image restoration filter based on the first point spread function for the visible light of the optical system.

6. The image processing device according to claim 5, wherein:

the image data indicating the visible light image includes first color data, and second color data of two or more colors having a contribution rate for obtaining luminance data lower than that of the first color data; and the point image restoration processing unit performs the point image restoration process on the luminance data generated from the image data indicating the visible light image using the first point image restoration filter corresponding to the luminance data.

7. The image processing device according to claim 5, wherein:

the image data indicating the visible light image includes first color data, and second color data of two or more colors having a contribution rate for obtaining luminance data lower than that of the first color data; and the point image restoration processing unit performs the point image restoration process on the first color data and each of pieces of the second color data of two or more colors using the first point image restoration filter corresponding to each of the first color data and each of pieces of the second color data of two or more colors.

8. The image processing device according to claim 1, wherein in a case where the acquired image data is image data of only a near-infrared light component, the point image restoration processing unit performs only a point image restoration process on the image data of only the near-infrared light component using a second point image restoration filter based on a second point spread function for the near-infrared light of the optical system.

9. An image processing device, comprising:

an image acquisition unit that acquires image data including the near-infrared light image captured with sensitivity to a visible light wavelength band and a near-infrared light wavelength band using an optical system; and a point image restoration processing unit that performs a point image restoration process on the acquired image data using a point image restoration filter based on a point spread function for visible light and near-infrared light of the optical system, wherein:

the point image restoration processing unit includes a light amount ratio detection unit that detects a light amount ratio between a first amount of light by the visible light and a second amount of light by the near-infrared light at the time of capturing the near-infrared light image when performing the point image restoration process using the point image restoration filter; and the point image restoration processing unit performs the point image restoration process using the point image restoration filter based on the point spread function according to the detected light amount ratio.

10. The image processing device according to claim 9, wherein:

the point image restoration processing unit includes:

a point spread function generation unit that generates the point spread function for visible light and near-infrared light of the optical system obtained by performing weighted averaging on a first point spread function for visible light of the optical system and a second point spread function for near-infrared light of the optical system according to the light amount ratio detected by the light amount ratio detection unit; and a point image restoration filter generation unit that generates the point image restoration filter on the basis of the generated point spread function; and the point image restoration processing unit performs the point image restoration process using the generated point image restoration filter.

11. The image processing device according to claim 9, wherein:

the point image restoration processing unit includes:

a point spread function storage unit that stores a plurality of point spread functions corresponding to the light amount ratio detected by the light amount ratio detection unit; and a point image restoration filter generation unit that reads the point spread function corresponding to the light amount ratio detected by the light amount ratio detection unit from the point spread function storage unit, and generates the point image restoration filter from the read point spread function; and the point image restoration processing unit performs the point image restoration process using the generated point image restoration filter.

12. The image processing device according to claim 9, wherein:

the point image restoration processing unit includes a point image restoration filter storage unit that stores a plurality of point image restoration filters based on a plurality of point spread functions corresponding to the light amount ratio detected by the light amount ratio detection unit; and the point image restoration processing unit reads the point image restoration filter corresponding to the light amount ratio detected by the light amount ratio detection unit from the point image restoration filter storage unit, and performs the point image restoration process using the read point image restoration filter.

13. An imaging device, comprising:

the image processing device according to claim 1; and a near-infrared light emitting unit that emits near-infrared light as auxiliary light at the time of capturing the near-infrared light image.

14. The imaging device according to claim 13, wherein:

the optical system is an optical system in which an infrared cut filter is insertable into an imaging optical path or retractable from the imaging optical path; and the image acquisition unit is an imaging unit that images a subject using the optical system in which the infrared cut filter is inserted into the imaging optical path to acquire image data indicating the visible light image of the subject, causes near-infrared light to be emitted from the near-infrared light emitting unit, and images the subject using the optical system in which the infrared cut filter is retracted from the imaging optical path to acquire image data indicating the near-infrared light image of the subject.

15. The imaging device according to claim 13, wherein the image acquisition unit is an imaging unit that includes an imaging element in which a first pixel for capturing a visible light image with sensitivity to the visible light wavelength band and a second pixel for capturing a near-infrared light image with sensitivity to the visible light wavelength band and the near-infrared light wavelength band coexist and are arranged, acquires image data indicating the visible light image of a subject using the optical system and the first pixel of the imaging element, causes the near-infrared light to be emitted from the near-infrared light emitting unit, and acquires the image data indicating the near-infrared light image of the subject using the optical system and the second pixel of the imaging element.

16. An image processing method, comprising:

a step of acquiring image data including a near-infrared light image captured with sensitivity to a visible light wavelength band and a near-infrared light wavelength band using an optical system;

a step of performing a point image restoration process on the acquired image data using a first point image restoration filter based on a first point spread function for visible light of the optical system and a second point image restoration filter based on a second point spread function for near-infrared light of the optical system; and a step of controlling the point image restoration process to adjust a first restoration rate in the point image restoration process using the first point image restoration filter and a second restoration rate in the point image restoration process using the second point image restoration filter for the acquired image data, the step including detecting a light amount ratio between a first light amount by visible light and a second light amount by near-infrared light at the time of capturing the near-infrared light image, and adjusting the first restoration rate and the second restoration rate according to the detected light amount ratio.

17. An image processing method, comprising:

a step of acquiring image data including a near-infrared light image captured with sensitivity to a visible light wavelength band and a near-infrared light wavelength band using an optical system; and a step of performing a point image restoration process on the acquired image data using a point image restoration filter based on a point spread function for visible light and near-infrared light of the optical system, wherein the step of performing the point image restoration process on the acquired image data, the acquired image data being captured under a light source in which visible light and near-infrared light coexist using the point image restoration filter, includes detecting a light amount ratio between a first light amount by visible light and a second light amount by near-infrared light at the time of capturing the near-infrared light image, and performing the point image restoration process using the point image restoration filter based on the point spread function according to the detected light amount ratio.

18. A non-transitory computer-readable tangible medium containing an image processing program that causes a computer to execute:

a step of acquiring image data including a near-infrared light image captured with sensitivity to a visible light wavelength band and a near-infrared light wavelength band using an optical system;

a step of performing a point image restoration process on the acquired image data using a first point image restoration filter based on a first point spread function for visible light of the optical system and a second point image restoration filter based on a second point spread function for near-infrared light of the optical system; and a step of controlling the point image restoration process to adjust a first restoration rate in the point image restoration process using the first point image restoration filter and a second restoration rate in the point image restoration process using the second point image restoration filter for the acquired image data, the step including detecting a light amount ratio between a first light amount by visible light and a second light amount by near-infrared light at the time of capturing the near-infrared light image, and adjusting the first restoration rate and the second restoration rate according to the detected light amount ratio.

19. A non-transitory computer-readable tangible medium containing an image processing program that causes a computer to execute:

a step of acquiring image data including a near-infrared light image captured with sensitivity to a visible light wavelength band and a near-infrared light wavelength band using an optical system; and a step of performing a point image restoration process on the acquired image data using a point image restoration filter based on a point spread function for visible light and near-infrared light of the optical system, wherein the step of performing the point image restoration process on the acquired image data, the acquired image data being captured under a light source in which visible light and near-infrared light coexist using the point image restoration filter, includes detecting a light amount ratio between a first light amount by visible light and a second light amount by near-infrared light at the time of capturing the near-infrared light image, and performing the point image restoration process using the point image restoration filter based on the point spread function according to the detected light amount ratio.

* * * * *